(12) United States Patent
Nakae

(10) Patent No.: US 7,523,303 B2
(45) Date of Patent: *Apr. 21, 2009

(54) SYSTEM AND METHOD FOR DISTRIBUTING DIGITAL WORKS, APPARATUS AND METHOD FOR REPRODUCING DIGITAL WORKS, AND COMPUTER PROGRAM PRODUCT

(75) Inventor: Masayuki Nakae, Tokyo (JP)

(73) Assignee: NEC Corporation, Tokyo (JP)

( * ) Notice: Subject to any disclaimer, the term of this patent is extended or adjusted under 35 U.S.C. 154(b) by 507 days.

This patent is subject to a terminal disclaimer.

(21) Appl. No.: 10/834,934

(22) Filed: Apr. 30, 2004

(65) Prior Publication Data

US 2004/0255138 A1    Dec. 16, 2004

Related U.S. Application Data

(62) Division of application No. 09/362,657, filed on Jul. 29, 1999, now Pat. No. 6,857,071.

(30) Foreign Application Priority Data

Jul. 29, 1998    (JP)    ................... 10-213789

(51) Int. Cl.
    *H04L 9/00* (2006.01)
    *G06F 12/14* (2006.01)
    *H04K 1/00* (2006.01)
    *H04N 7/167* (2006.01)

(52) U.S. Cl. .................. 713/156; 713/165; 713/178; 713/179; 713/193; 726/26; 726/27; 380/201; 380/203; 380/239; 380/255; 380/277; 380/281; 705/57; 705/58; 705/59

(58) Field of Classification Search .................. 713/156
    See application file for complete search history.

(56) References Cited

U.S. PATENT DOCUMENTS 4,386,233 A    5/1983    Smid et al.

(Continued)

FOREIGN PATENT DOCUMENTS

| EP | 746126 | A2 | * | 12/1996 |
| EP | 1691315 | A1 | * | 8/2006 |
| GB | 2327567 | A | * | 1/1999 |

OTHER PUBLICATIONS

Hulsebosch et al, Context Sensitive Access Control, 2005, ACM, pp. 111-119.*

(Continued)

*Primary Examiner*—Christopher A Revak
*Assistant Examiner*—Aravind K Moorthy
(74) *Attorney, Agent, or Firm*—Young & Thompson

(57) ABSTRACT

An editing apparatus generates a capsular work with usage conditions for each of plural usages and usage secret information. A ticket server apparatus issues a ticket containing a ticket key in the case of allowing a user to practice the usage requested by the user. A distribution center apparatus distributes the capsular work in accordance with the user's request. An audiovisual apparatus acquires the capsular work from the distribution center apparatus and requests the ticket necessary to make use of the capsular work from the ticket server apparatus, and then decrypts the encrypted work data contained in the capsular work and reproduces the work data only in the case where the audiovisual apparatus has acquired the ticket.

20 Claims, 30 Drawing Sheets

U.S. PATENT DOCUMENTS

| | | | | |
|---|---|---|---|---|
| 4,644,493 | A | | 2/1987 | Chandra et al. |
| 5,058,162 | A | * | 10/1991 | Santon et al. ............... 705/51 |
| 5,065,429 | A | * | 11/1991 | Lang ........................... 705/56 |
| 5,144,665 | A | | 9/1992 | Takaragi et al. |
| 5,319,705 | A | | 6/1994 | Halter et al. |
| 5,485,577 | A | | 1/1996 | Eyer et al. |
| 5,638,446 | A | | 6/1997 | Rubin |
| 5,661,799 | A | * | 8/1997 | Nagel et al. ................. 705/52 |
| 5,675,649 | A | * | 10/1997 | Brennan et al. ............. 380/286 |
| 5,845,281 | A | * | 12/1998 | Benson et al. ................ 707/9 |
| 6,023,506 | A | * | 2/2000 | Ote et al. .................... 713/165 |
| 6,430,292 | B1 | * | 8/2002 | Ito et al. ..................... 380/280 |
| 2001/0053979 | A1 | * | 12/2001 | Kori ............................ 705/1 |
| 2002/0007347 | A1 | * | 1/2002 | Blumenthal et al. .......... 705/51 |

OTHER PUBLICATIONS

Hine et al, Securing Distributed Computing Against the Hostile Host, 2004, ACM, pp. 279-286.*

Fujiyoshi et al, Hierarchical Encryption of Multimedia Contents for Access Control, 2006, IEEE, pp. 1977-1980.*

Zhang et al, A centralized key management scheme for hierarchical access control, 2004, IEEE, pp. 2067-2071.*

Nakajima et al. "Development of the Decure Digital Contents Distribution System—Digitex"; 1998 Electronic Communications Information Association Convention Report, vol. 2, No. SD-3-7 (Mar. 27-30, 1998); pp. 532-533.

Tamai et al. "Music Contents Sales System Which Uses the Information Platform 'Infotek'"; 1998 Electronic Communications Information Association Convention Report, vol. 2, No. SD-3-8 (Mar. 27-30, 1998); pp. 534-535.

Takahashi et al. "Infotek electronic publication service," NTT TEchnology Journal, vol. 10, No. 7 (Jul. 1, 1998); pp. 18-22.

Tamai et al. "Information Distribution System 'Infoprotect' for protecting author rights"; NTT Technololgy Journal, vol. 10, No. 7, (Jul. 1, 1998) pp. 23-25.

Sato et al. "Electronic Publication Proof Test Using 'Infoket'"; NTT Technology Journal, vol. 10, No. 2, (Feb. 1, 1998) pp. 82-85.

Masakoneoka et al. "Information distribution platform 'Infoket'"; NTT Technology Journal, vol. 9, No. 5, (May 1, 1997) pp. 52-55.

* cited by examiner

FIG. 7

| USAGE CONDITION SETTING DIALOG | | | |
|---|---|---|---|

AUTHOR ID: Nakae

WORK ID: Movie980506

CONTROL TARGET

| | | | |
|---|---|---|---|
| VIEW: | ● PERMITTED ANYTIME | ○ SET CONDITIONS | ○ NOT PERMITTED |
| STORE: | ○ PERMITTED ANYTIME | ○ SET CONDITIONS | ● NOT PERMITTED |
| PRINT: | ○ PERMITTED ANYTIME | ● SET CONDITIONS | ○ NOT PERMITTED |
| EDIT: | ○ PERMITTED ANYTIME | ○ SET CONDITIONS | ● NOT PERMITTED |

[OK]  [CANCEL]

FIG. 8

USAGE CONDITION SETTING DIALOG

AUTHOR ID: Nakae

WORK ID: Movie980506

CONTROL TARGET
- VIEW: ● PERMITTED ANYTIME   ○ SET CONDITIONS   ○ NOT PERMITTED
- STORE: ○ PERMITTED ANYTIME   ○ SET CONDITIONS   ● NOT PERMITTED
- PRINT: ○ PERMITTED ANYTIME   ● SET CONDITIONS   ○ NOT PERMITTED
- EDIT: ○ PERMITTED ANYTIME   ○ SET CONDITIONS   ● NOT PERMITTED

[OK]   [CANCEL]

SETTING OF PRINTING CONDITIONS

LIST OF PERMIED USERS: hosomi, ichiyama

RESTRICTIONS
- COLOR: 256 COLORS OR LESS
- QUALITY: 600 dpi OR LOWER
- PAPER SIZE: A4 OR SMALLER

CHARGED AMOUNT: $ 2

[OK]   [CANCEL]

FIG. 10

| USAGE | USAGE SECRET INFORMATION |
|---|---|
| VIEW | 95AD438A |
| STORE | N/A |
| PRINT | F38F05AD |
| EDIT | N/A |

FIG. 15

| WORK ID | Movie980507 |
|---|---|
| USER ID | nakae |
| TICKET SERIAL NUMBER | TK980507,AZK8311 |
| TICKET KEY | 98AF0523EC41AD09 |
| PERMITTED USAGE | Print |
| ISSUE DATE | 1998/05/07 |
| VALIDITY TERM | 1998/05/07 |

FIG. 27

| WORK ID | Movie980507 |
|---|---|
| USER ID | nakae |
| TICKET SERIAL NUMBER | TK980507,AZK8311 |
| TICKET KEY | 98AF0523EC41AD09 |
| PERMITRED USAGE | Print |
| CHARGING MODULE NAME | chargeAtOnce |
| ARGUMENT TO CHARGING MODULE | $ 40 |
| ISSUE DATE | 1998/05/07 |
| VALIDITY TERM | 1998/05/07 |

FIG. 29

| | | |
|---|---|---|
| BASIC METHOD | charge() | PERFORMS CHARGING PROCESSING |
| | expire() | DELETES CHARGING MODULE FROM EXECUTION QUEUE AND PERFORMS INVOLVED PROCESSING |
| BUILT-IN METHOD | disableTicket() | INVALIDATES TICKET |
| | transmitToWallet() | PASS CHARGING INFORMATION TO ELECTRONIC WALLET APPARATUS |
| | timer() | PERFORMAS SETTING SO AS TO REGULARLY CALL charge() |
| | _expire() | ACTUALLY DELETES OWN CHARGING MODULE FROM EXECUTION QUEUE |
| USER-DEFINED METHOD | FREE DEFINED BY AUTHOR | |

SYSTEM AND METHOD FOR DISTRIBUTING DIGITAL WORKS, APPARATUS AND METHOD FOR REPRODUCING DIGITAL WORKS, AND COMPUTER PROGRAM PRODUCT

CROSS-REFERENCE TO RELATED APPLICATIONS

This application is a division of application Ser. No. 09/362,657, filed on Jul. 29, 1999, and issued as U.S. Pat. No. 6,857,071, the entire contents of which are hereby incorporated by reference.

BACKGROUND OF THE INVENTION

1. Field of the Invention

The present invention relates to a system and method for distributing digital works, an apparatus and method for reproducing digital works, and computer program products including computer usable mediums in which computer readable programs for the above system, apparatus and methods have been embodied. More particularly, the present invention relates to the control of use of digital works, the control of use of secondary works, and the levy of charges for the use of digital works.

2. Description of the Related Art

In a digital work distribution system, encrypted software and multimedia contents are supplied to users, and the users pay prices conforming to the usage rules presented by sellers, through utilization of credit cards, banks, electronic money, etc. An example of a conventional digital work distribution system is described in Unexamined Japanese Patent Application KOKAI Publication No. H9-138827.

The digital work distribution system described in the above publication includes a distribution center apparatus and a user apparatus. Having made an appropriate usage contract with a user in regard to a work which the user has requested through the user apparatus, the distribution center apparatus encrypts work data representing the work by using a public key of the user, and transmits the encrypted work data to the user apparatus.

The work data sent to the user apparatus has usage conditions affixed thereto. Based on those usage conditions, the use of the work is restricted to a usage such as "reference only", "editable" or the like. Original data, secondary work data, etc. are encapsulated together to provide a secondary work, which is distributed through the distribution center apparatus as in the case of the original data.

Another work distribution system is also generally well known, in which a work is encrypted and a decipher key of the work is distributed only in the case where a predetermined amount of money has been paid.

Meanwhile, a Kerberos system is also well known, which verifies using a common cipher that authentication information I is information generated by a prover P.

According to this system:
(1) a key distribution center passes, to the prover P, a key "Kc, s" and a ticket in which data, containing the authentication information I and a session key "Kp, v", has been encrypted with a key of the prover P;
(2) the prover P passes the ticket to a verifier V;
(3) the prover P also passes to the verifier V an authenticator in which the authentication information I has been encrypted with the key "Kc, s";
(4) the verifier V decrypts the authentication information I and the key "Kp, v" contained in the ticket by using a key Kv, and further decrypts the authentication information I contained in the authenticator by using the key "Kc, s", and then certifies that the authentication information I contained in the ticket and that contained in the authenticator are identical with each other.

Let it be considered the case wherein the above-described Kerberos system is applied to a digital work distribution system, and the authentication information is replaced by a work, while the session keys are replaced by keys according to usage of the work. In this case, the use of the work can be controlled by distributing the work in an encrypted state and distributing the ticket (not containing the work) at the time of use of the work.

According to another digital work distribution system in which the use of the work is strictly limited, an inhibited usage list that specifies impossible usages is affixed to the work, and the list is interpreted to determine whether a variety of usages can be practiced or not. An example of this kind of digital work distribution system is described in Unexamined Japanese Patent Application KOKAI Publication No. H9-269916.

The digital work distribution system described in the above publication includes an editing apparatus, a distribution server apparatus and an audiovisual apparatus. The editing apparatus edits a work, generates an inhibited usage list, and encapsulates them in a capsular work. The distribution server apparatus distributes the capsular work to the audiovisual apparatus. The audiovisual apparatus opens the capsular work. Based on the inhibited usage list, such hooks as would prevent the interprocess communications of messages are applied in correspondence with a variety of usages to an operating system for the audiovisual apparatus. By so doing, the usages specified in the list are inhibited.

According to another digital work distribution system which enables the copyright of the secondary work to be protected, the author of a secondary work generates a secondary cipher key different from a cipher key used to encrypt the primary work. The secondary work is encrypted with the secondary cipher key and is then distributed. In this case, in order to grasp the authoring of such secondary works, a copyright management center manages their secondary cipher keys. An example of this kind of digital work distribution system is described in Unexamined Japanese Patent Application KOKAI Publication No. H8-272745.

According to the digital work distribution system described in the above publication, a primary work is encrypted with a primary cipher key. In the case of creating and distributing the secondary work which utilizes the primary work, the secondary cipher key is generated and the secondary work is distributed after encrypted with the secondary cipher key. The secondary work is one in which the original data representing the primary work and procedures for creating the secondary work have been encapsulated. The primary cipher key is used to decrypt the encrypted original data representing the primary work, while the secondary cipher key is used to decrypt the entirety of the encrypted secondary work.

There has been proposed a method for making a charge for use of a work on the basis of the monitored frequency of use. An example of a work usage control system employing this method is described in Unexamined Japanese Patent Application KOKAI Publication No. H8-95777.

In the work usage control system described in the above publication, the frequency of use, i.e., the number of times a work has been used, is counted each time a predetermined use of the work is made. The work has the charging information affixed thereto. The charging information has undertaken such a setting as would allow the work to be used a predetermined number of times without charge.

The conventional systems described above have the following drawbacks:

The first drawback is that an author's request and a seller's request as to the control of a distributed work are not satisfactorily reflected. This is because only a fixed usage of capsular work data received by a user is controllable. In the case where the author and the seller wish to control different usages of the work data, they have to make a number of usage conditions and perform encapsulation with respect to each of those usage conditions. However, this cannot be said to be enough to reflect the intentions of the author and seller.

The second drawback is that it is risky to encapsulate the usage conditions and the work together. The reason for this is that although the usage conditions and the work data are stored in a nonvolatile memory, any illicit change can be made to the usage conditions stored in the nonvolatile memory.

The third drawback is that the efficiency of use of the secondary work is low. The reason for this is that according to a method as that described in Unexamined Japanese Patent Application KOKAI Publication No. H8-272725 mentioned previously, the encrypted original work has to be decrypted first and thereafter data added as the secondary work has to be decrypted in the case of using the secondary work. Normally, a work such as an image or a moving picture is excessively large in size. Therefore, if decryption is executed a number of times as in the case of the above method, this will considerably lower the throughput of a reproducing process.

The fourth drawback is that retaining the variety of distributed works is difficult. This is because if a method for making a charge is predetermined according to system or if a charge is made based only on a fixed unit, e.g. the frequency of use, this will entail the difficulty of dealing with a variety of works, such as works (of a pay-per-view type) like movies and works (of such a type as can be used over and over without charge once purchased) like books.

SUMMARY OF THE INVENTION

It is accordingly an object of the present invention to reflect the intentions of authors and sellers as regards the control of use of distributed digital works.

It is another object of the present invention to ensure improved security to digital works.

It is a further object of the present invention to suppress the lowering of throughput due to encrypted work data being decrypted at the time of reproducing secondary works.

It is a still further object of the present invention to enhance the flexibility of the processing of making charges for digital works.

According to the first aspect of the present invention, there is provided a digital work distribution system for distributing digital works, comprising:

usage condition setting means for setting conditions for plural usages of work data to be distributed;

work encrypting means for encrypting the work data with a predetermined encryption key;

ticket key generating means for generating different ticket encryption keys and their corresponding ticket decryption keys, each of the ticket encryption keys and its corresponding one of the ticket decryption keys being associated with conditions for one usage among the conditions for the plural usages which have been set by the usage condition setting means;

decryption key encrypting means for encrypting a predetermined decryption key corresponding to the predetermined encryption key, by using each of the ticket encryption keys generated each in association with the conditions for one of the plural usages by the ticket key generating means;

encapsulating means for encapsulating the work data and the predetermined decryption key which the decryption key encrypting means has encrypted using each of the ticket encryption keys generated each in association with the conditions for one of the plural usages, and for generating a capsular work which contains the work data and the predetermined decryption key;

usage condition storing means for storing, in association with each other, the conditions for the plural usages which have been set by the usage condition setting means and the ticket decryption keys corresponding to the ticket encryption keys generated each in association with the conditions for one of the plural usages and used to encrypt the predetermined decryption key;

ticket decryption key encrypting means for encrypting, in reply to an external request for use of the work data, a ticket decryption key which is associated with the conditions for one usage corresponding to the request among the ticket decryption keys stored in the usage condition storing means; and ticket distribution means for distributing the ticket decryption key encrypted by the ticket decryption key encrypting means to a requester who has made the request for use of the work data.

In the above-described digital work distribution system, the distributed capsular work does not contain the decryption key of its work data. Therefore, the work data can be distributed freely with security being maintained. In the case of allowing a user to make use of the work data, the ticket distributing means needs only distribute a ticket encryption key to him/her. This enhances the work distribution area and promotes the use of the work data.

Furthermore, the usage condition setting means sets usage conditions for usages of the work data, and the ticket key generating means generates ticket keys (encryption keys and decryption keys) which differ depending on the usage conditions. This enables the work data to be used on the usage conditions set in accordance with the intentions of an author and a seller.

According to the second aspect of the present invention, there is provided a digital work distribution system for distributing digital works, comprising first and second computers which are connected to each other via a network and each of which has a memory and a central processing unit, wherein the first computer executes a program to perform:

setting conditions for plural usages of work data to be distributed;

encrypting the work data with a predetermined encryption key;

generating different ticket encryption keys and their corresponding ticket decryption keys, each of the ticket encryption keys and its corresponding one of the ticket decryption keys being associated with conditions for one usage among the set conditions for the plural usages;

encrypting a predetermined decryption key corresponding to the predetermined encryption key, by using each of the ticket encryption keys generated each in association with the conditions for one of the plural usages; and encapsulating the work data and the predetermined decryption key encrypted using each of the ticket encryption keys generated each in association with the conditions for one of the plural usages, and generating a capsular work which contains the work data and the predetermined decryption key; and the second computer executes a program to perform:

storing, in association with each other, the conditions for the plural usages which have been set by the first computer and the ticket decryption keys corresponding to the ticket encryption keys generated each in association with the conditions for one of the plural usages and used to encrypt the predetermined decryption key;

encrypting, in reply to an external request for use of the work data, a ticket decryption key which is associated with the conditions for one usage corresponding to the request among the stored ticket decryption keys; and distributing the encrypted ticket decryption key to a requester who has made the request for use of the work data.

The above-described digital work distribution system may further comprise a third computer which is connected to the network and which has a memory and a processor, and the third computer can perform:

storing the capsular work generated by the first computer; and distributing the stored capsular work.

In the digital work distribution system, the predetermined encryption key and the predetermined decryption key corresponding thereto may be an identical key adopting a common cryptographic system.

A common cryptographic key which is a random number may be used for encryption and decryption of the capsular work.

Furthermore, in the above-described digital work distribution system, each of the ticket encryption keys and its corresponding one of the ticket decryption keys may be an identical key adopting a common cryptographic system.

Moreover, the first computer and the second computer may be the same computer.

The first computer may further perform:

generating secondary work data to be distributed, based on the work data contained in the capsular work;

setting conditions for plural usages of the secondary work data to be distributed;

encrypting the secondary work data with a predetermined encryption key;

generating different original ticket keys each in association with the conditions for one of the plural usages of the secondary work data;

encrypting a predetermined decryption key corresponding to the predetermined encryption key of the secondary work data, by using each of the original ticket keys generated each in association with the conditions for one of the plural usages of the secondary work data;

encapsulating the secondary work data and the predetermined decryption key encrypted using each of the original ticket keys generated each in association with the conditions for one of the plural usages of the secondary work data, and generating a capsular work which contains the secondary work data and the predetermined decryption key; and generating other ticket decryption keys, based on the original ticket keys and the ticket decryption keys of the work data on which the secondary work data bases; and the second computer may further perform:

storing the conditions for the plural usages of the secondary work and the aforementioned other ticket decryption keys in association with each other and transmitting, in reply to an external request for use of the secondary work data, one of the aforementioned other ticket decryption keys which is associated with the conditions for one usage corresponding to the request, to a requester who has made the request for use of the secondary work.

In this case, the secondary work data can be distributed in the same manner as the primary work data. This promotes the work authoring activities. In order to make use of the secondary work, any original ticket key is required. In order to acquire any original ticket key, a ticket decryption key of the original work data and a corresponding one of the aforementioned other ticket decryption keys are necessary. Thus, the copyright owned by the primary author is protected satisfactorily.

The first computer may otherwise further perform:

generating charging modules to effect processing of making a charge for the work data to be distributed, each of the charging modules being associated with the conditions for one of the plural usages;

further encapsulating, in the capsular work, the charging modules generated each in association with the conditions for one of the plural usages; and the second computer may otherwise further perform:

storing pieces of charging module identification for identifying the charging modules, in association with the conditions for the plural usages.

In this case, the charging processing is executed by the charging modules. The charging modules can be generated each for the conditions of one of the plural usages, and therefore an appropriate charging method can be flexibly selected depending on the intentions of an author and a seller as to the distribution or depending on the characters of a work.

The above-described digital work distribution system may further comprise a third computer which is connected to the network and which has a memory and a processor, and the third computer may perform:

acquiring the capsular work generated by the first computer;

acquiring a ticket decryption key corresponding to a ticket encryption key associated with the conditions for a desired one of the plural usages and contained in the acquired capsular work;

decrypting, with the acquired ticket decryption key, the encrypted decryption key contained in the capsular work;

decrypting the work data contained in the capsular work by using the decrypted decryption key; and reproducing the decrypted work data.

In the case where the digital work distribution system is structured as above, the first computer may further perform:

generating charging modules to effect processing of making a charge for the work data to be distributed, each of the charging modules being associated with the conditions for one of the plural usages; and further encapsulating, in the capsular work, the charging modules generated each in association with the conditions for one of the plural usages; and the second computer may further perform:

storing pieces of charging module identification information for identifying the charging modules, in association with the conditions for the plural usages, and distributing, to the requester who has made the request for use of the work data, a piece of charging module identification information associated with the conditions for one usage corresponding to the request among the stored pieces of charging module identification; and the third computer may further perform:

extracting the charging modules contained in the acquired capsular work and storing the extracted charging modules; and executing the processing of making a charge for the work data by employing one of the stored charging modules in accordance with the piece of charging module identification information transmitted in reply to the request for use of the work data.

According to the third aspect of the present invention, there is provided a digital work reproduction apparatus for reproducing digital works, comprising an input section, an output section, a memory which stores a predetermined program, and a central processing unit, wherein the central processing unit executes the predetermined program, stored in the memory, for performing:

acquiring a capsular work in which work data encrypted with a predetermined encryption key, and a predetermined decryption key encrypted with each of different ticket encryption keys associated each with conditions for one of plural usages of the work data, are encapsulated;

acquiring a ticket decryption key corresponding to a ticket encryption key associated with the conditions for a desired one of the plural usages and contained in the acquired capsular work;

decrypting, with the acquired ticket decryption key, the encrypted predetermined decryption key contained in the capsular work;

decrypting, with the decrypted predetermined decryption key, the work data contained in the capsular work; and reproducing the decrypted work data.

In the above-described digital work reproduction apparatus, charging modules to effect processing of making a charge for the work data may be further encapsulated in the capsular work, and the central processing unit may perform:

acquiring a piece of charging module identification information which is associated with the conditions for the desired one of the plural usages, among pieces of charging module identification information for identifying the charging modules;

extracting the charging modules contained in the acquired capsular work and storing the extracted charging modules; and executing the processing of making a charge for the work data by employing one of the stored charging modules in accordance with the acquired piece of charging module identification information.

According to the fourth aspect of the present invention, there is provided a digital work distribution method for distributing digital works, comprising:

setting conditions for plural usages of work data to be distributed;

encrypting the work data with a predetermined encryption key;

generating different ticket encryption keys and their corresponding ticket decryption keys, each of the ticket encryption keys and its corresponding one of the ticket decryption keys being associated with the set conditions for one of the plural usages;

encrypting a predetermined decryption key corresponding to the predetermined encryption key, by using each of the ticket encryption keys generated each in association with the conditions for one of the plural usages;

encapsulating the work data and the predetermined decryption key encrypted using each of the ticket encryption keys associated each with the conditions for one of the plural usages, and generating a capsular work which contains the work data and the predetermined decryption key;

storing, in association with each other, the set conditions for the plural usages and the ticket decryption keys corresponding to the ticket encryption keys generated each in association with the conditions for one of the plural usages and used to encrypt the predetermined decryption key;

encrypting, in reply to an external request for use of the work data, a ticket decryption key which is associated with the conditions for one usage corresponding to the request among the stored ticket decryption keys; and distributing the encrypted ticket decryption key to a requester who has made the request for use of the work data.

The above-described digital work distribution method may further comprise:

generating secondary work data to be distributed, based on the work data contained in the capsular work;

setting conditions for plural usages of the secondary work data to be distributed;

encrypting the secondary work data with a predetermined encryption key;

generating different original ticket keys each in association with the conditions for one of the plural usages of the secondary work data;

encrypting a predetermined decryption key corresponding to the predetermined encryption key of the secondary work data, by using each of the original ticket keys generated each in association with the conditions for one of the plural usages of the secondary work data;

encapsulating the secondary work data and the predetermined decryption key encrypted using each of the original ticket keys generated each in association with the conditions for one of the plural usages, and generating a capsular work which contains the secondary work data and the predetermined decryption key;

generating other ticket decryption keys, based on the original ticket keys and the ticket decryption keys of the work data on which the secondary work data bases; and storing the conditions for the plural usages of the secondary work and the aforementioned other ticket decryption keys in association with each other and transmitting, in reply to an external request for use of the secondary work data, one of the aforementioned other ticket decryption keys which is associated with the conditions for one usage corresponding to the request, to a requester who has made the request for use of the secondary work.

The above-described digital work distribution method may otherwise further comprise:

generating charging modules to effect processing of making a charge for the work data to be distributed, each of the charging modules being associated with the conditions for one of the plural usages;

further encapsulating, in the capsular work, the charging modules generated each in association with the conditions for one of the plural usages; and storing pieces of charging module identification information for identifying the charging modules, in association with the conditions for the plural usages.

According to the fifth embodiment of the present invention, there is provided a digital work reproduction method for reproducing digital works, comprising:

acquiring a capsular work in which work data encrypted with a predetermined encryption key, and a predetermined decryption key corresponding to the predetermined encryption key and encrypted with each of different ticket encryption keys associated each with conditions for one of plural usages of the work data, are encapsulated;

acquiring a ticket decryption key corresponding to a ticket encryption key associated with the conditions for a desired one of the plural usages and contained in the acquired capsular work;

decrypting, with the acquired ticket decryption key, the encrypted predetermined decryption key contained in the capsular work;

decrypting, with the decrypted predetermined decryption key, the work data contained in the capsular work; and reproducing the decrypted work data.

According to the sixth aspect of the present invention, there is provided a computer program product, including a computer usable medium having a computer readable program embodied therein for executing:

setting conditions for plural usages of work data to be distributed;

encrypting the work data with a predetermined encryption key;

generating different ticket encryption keys and their corresponding ticket decryption keys, each of the ticket encryption keys and its corresponding one of the ticket decryption keys being associated with the set conditions for one of the plural usages;

encrypting a predetermined decryption key corresponding to the predetermined encryption key, by using each of the ticket encryption keys generated each in association with the conditions for one of the plural usages; and encapsulating the work data and the predetermined decryption key encrypted using each of the ticket encryption keys generated each in association with the conditions for one of the plural usages, and generating a capsular work which contains the work data and the predetermined decryption key.

In the above-described computer program product, the program may further execute:

generating secondary work data to be distributed, based on the work data contained in the capsular work;

setting conditions for plural usages of the secondary work data to be distributed;

encrypting the secondary work data with a predetermined encryption key;

generating different original ticket keys each in association with the conditions for one of the plural usages of the secondary work data;

encrypting a predetermined decryption key corresponding to the predetermined encryption key of the secondary work data, by using each of the original ticket keys generated each in association with the conditions for one of the plural usages of the secondary work data;

encapsulating the secondary work data and the predetermined decryption key encrypted using each of the original ticket keys generated each in association with the conditions for one of the plural usages of the secondary work data, and generating a capsular work which contains the secondary work data and the predetermined decryption key; and generating other ticket decryption keys, based on the original ticket keys and the ticket decryption keys of the work data on which the secondary work data bases.

In the above-described computer program product, the program may otherwise further execute:

generating charging modules to effect processing of making a charge for the work data to be distributed, each of the charging modules being associated with the conditions for one of the plural usages; and further encapsulating, in the capsular work, the charging modules generated each in association with the conditions for one of the plural usages.

According to the seventh aspect of the present invention, there is provided a computer program product, including a computer usable medium having a computer readable program embodied therein for executing:

storing, in association with each other, conditions for plural usages of work data and ticket decryption keys which correspond to ticket encryption keys associated each with conditions for one of the plural usages and used to encrypt a decryption key of the work data encrypted;

encrypting, in reply to an external request for use of the work data, a ticket decryption key which is associated with the conditions for one usage corresponding to the request among the stored ticket decryption keys,; and distributing the encrypted ticket decryption key to a requester who has made the request for use of the work data.

According to the eighth aspect of the present invention, there is provided a computer program product, including a computer usable medium having a computer readable program embodied therein for executing:

acquiring a capsular work in which work data encrypted with a predetermined encryption key, and a predetermined decryption key corresponding to the predetermined encryption key and encrypted using each of different ticket encryption keys associated with conditions for plural usages of the work data, are encapsulated;

acquiring a ticket decryption key corresponding to a ticket encryption key which is associated with the conditions for a desired one of the plural usages and which is contained in the acquired capsular work;

decrypting, with the acquired ticket decryption key, the predetermined decryption key encrypted using the ticket encryption keys and contained in the capsular work;

decrypting the work data contained in the capsular work by using the decrypted predetermined decryption key; and reproducing the decrypted work data.

According to the ninth aspect of the present invention, there is provided a program signal embedded in a carrier wave and representing a program comprising:

a usage condition setting segment which sets conditions for plural usages of work data to be distributed;

a work encrypting segment which encrypts the work data with a predetermined encryption key;

a ticket key generating segment which generates different ticket encryption keys and their corresponding ticket decryption keys, each of the ticket encryption keys and its corresponding one of the ticket decryption keys being associated with conditions for one usage among the conditions for the plural usages which have been set by the usage condition setting segment;

a decryption key encrypting segment which encrypts a predetermined decryption key corresponding to the predetermined encryption key, by using each of the ticket encryption keys generated each in association with the conditions for one of the plural usages; and an encapsulating segment which encapsulates the work data and the predetermined decryption key encrypted using each of the ticket encryption keys generated each in association with the conditions for one of the plural usages, and which generates a capsular work containing the work data and the predetermined decryption key.

In the above-described program signal, the program may further comprise:

a secondary work data generating segment which generates secondary work data to be distributed, based on the work data contained in the capsular work generated by the encapsulating segment;

a usage condition setting segment which sets conditions for plural usages of the secondary work data to be distributed;

a secondary work encrypting segment which encrypts the secondary work data with a predetermined encryption key;

an original ticket key generating segment which generates different original ticket keys each in association with the conditions for one of the plural usages of the secondary work data;

a decryption key encrypting segment which encrypts a predetermined decryption key corresponding to the predetermined encryption key, by using each of the original ticket keys generated each in association with the conditions for one of the plural usages of the secondary work data;

an encapsulating segment which encapsulates the secondary work data and the predetermined decryption key encrypted using each of the original ticket keys generated each in association with the conditions for one of the plural usages of the secondary work data, and which generates a capsular work containing the secondary work data and the predetermined decryption key; and a ticket decryption key generating segment which generates other ticket decryption keys, based on the original ticket keys and the ticket decryption keys of the work data on which the secondary work data bases.

In the above-described program signal, the program may otherwise further comprise:

a charging module generating segment which generates charging modules to effect processing of making a charge for the work data to be distributed, each of the charging modules being associated with the conditions for one of the plural usages; and an encapsulating segment which further encapsulates, in the capsular work, the charging modules generated each in association with the conditions for one of the plural usages by the charging module generating segment.

According to the tenth aspect of the present invention, there is provided a program signal embedded in a carrier wave and representing a program which comprises:

a usage condition storing segment which stores, in association with each other, conditions for plural usages of work data and ticket decryption keys which correspond to ticket encryption keys associated each with conditions for one of the plural usages and used to encrypt a decryption key of the work data encrypted;

a ticket decryption key encrypting segment which encrypts, in reply to an external request for use of the work data, a ticket decryption key which is associated with the conditions for one usage corresponding to the request among the stored ticket decryption keys; and a ticket distribution segment which distributes the encrypted ticket decryption key to a requester who has made the request.

According to the eleventh aspect of the present invention, there is provided a program signal which represents a program comprising:

a capsular work acquiring segment which acquires a capsular work in which work data encrypted with a predetermined encryption key, and a predetermined decryption key encrypted with each of different ticket encryption keys associated with conditions for plural usages of the work data, are encapsulated;

a ticket decryption key acquiring segment which acquires a ticket decryption key corresponding to a ticket encryption key associated with the conditions for a desired one of the plural usages and contained in the acquired capsular work;

a decryption key decrypting segment which decrypts, with the acquired ticket decryption key, the predetermined decryption key encrypted using the ticket encryption keys and contained in the capsular work; and a work data decrypting segment which decrypts the work data contained in the capsular work by using the decrypted predetermined decryption key.

BRIEF DESCRIPTION OF THE DRAWINGS

These objects and other objects and advantages of the present invention will become more apparent upon reading of the following detailed description and the accompanying drawings in which:

FIG. 7 is a diagram exemplifying a usage condition setting dialog;

FIG. 8 is a diagram exemplifying the operation of setting usage conditions;

FIG. 10 is a diagram exemplifying a usage secret information table;

FIG. 15 is a diagram exemplifying the structure of a ticket according to the first embodiment of the present invention;

FIG. 27 is a diagram exemplifying the structure of a ticket according to the third embodiment of the present invention;

FIG. 29 is a diagram showing a variety of methods carried out by a plurality of charging modules and an example of the function of each method.

DETAILED DESCRIPTION OF THE PREFERRED EMBODIMENT

Embodiments of the present invention will now be described with reference to the drawings.

First Embodiment

Figure 1:
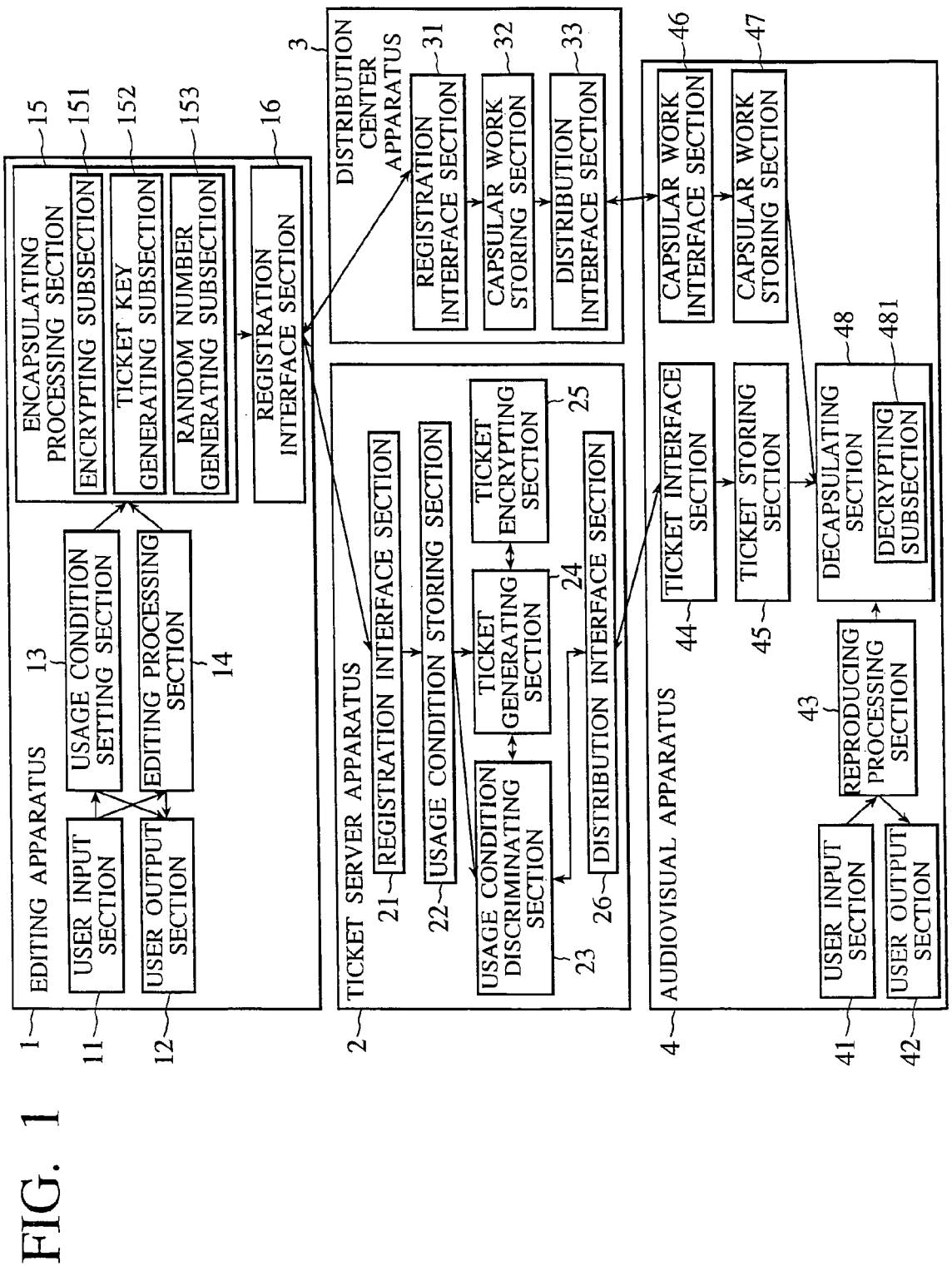
FIG. 1 is a block diagram showing the structure of a work distribution system according to the first embodiment of the present invention.

Referring to FIG. 1, a work distribution system according to the first embodiment of the present invention includes an editing apparatus 1 which edits, encapsulates and encrypts work data and usage conditions for usages of the work data, a ticket server apparatus 2 which manages tickets, a distribution center apparatus 3 which distributes encrypted works, and an audiovisual apparatus 4 where a work is utilized by a user. The editing apparatus 1 is owned by an author, while the ticket server 2 and the distribution center apparatus 3 are owned by either the author or a sales agent. The audiovisual apparatus 4 is owned by the user.

The editing apparatus 1 has a user input section 11 which includes a keyboard, a mouse, etc., a user output section 12 such as a monitor, a usage condition setting section 13, an editing processing section 14, an encapsulating processing section 15 and a registration interface section 16.

The usage condition setting section 13 creates the usage conditions of the work data produced by the editing processing section 14, while carrying on a dialog with the author through the user input section 11 and the user output section 12.

The editing processing section 14 creates the work data in accordance with an input from the user input section 11, and displays the created work data on the user output section 12. The encapsulating processing section 15 has an encrypting subsection 151, a ticket key generating subsection 152 and a random number generating subsection 153. Using each of ticket keys acquired from the ticket key generating subsection 152, the encrypting subsection 151 of the encapsulating processing section 15 encrypts random number R acquired from the random number generating subsection 153, and creates a usage secret information table based on the encryption results. Furthermore, in the encapsulating processing section 15, the encrypting subsection 151 encrypts random number R and the work data produced by the editing processing section 14, and generates capsular work data into which the result of encrypting random number R and the work data, and the usage secret information table have been combined.

The registration interface section 16 performs communications required for registering the usage conditions and a ticket key in the ticket server apparatus 2. Moreover, the registration interface section 16 performs communications necessary for storing a capsular work in the distribution center apparatus 3.

The ticket server apparatus 2 has a registration interface section 21, a usage condition storing section 22, a usage condition discriminating section 23, a ticket generating section 24, a ticket encrypting section 25 and a distribution interface section 26.

The registration interface section 21 performs communications for the registration of the usage conditions and ticket key created by the editing apparatus 1.

The usage condition storing section 22 stores the usage conditions and ticket key acquired from the registration interface section 21.

The usage condition discriminating section 23 discriminates whether the usage which the audiovisual apparatus 4 has requested through the distribution interface section 26 matches the usage conditions.

The ticket generating section 24 generates a ticket based on the usage conditions and ticket key stored in the usage condition storing section 22.

The ticket encrypting section 25 takes out an appropriate ticket from the usage condition storing section 22 and encrypts the ticket depending on who is the user thereof, in the case where the usage condition discriminating section 23 determines that the usage requested by the audiovisual apparatus 4 matches the usage conditions.

The distribution interface section 26 performs communications for receiving the request from the audiovisual apparatus 4 and communications for transmitting the encrypted ticket generated by the ticket encrypting section 25 to the audiovisual apparatus 4.

The distribution center apparatus 3 has a registration interface section 31, a capsular work storing section 32 and a distribution interface section 33.

The registration interface section 31 performs communications for receiving a capsular work generated by the editing apparatus 1.

The capsular work storing section 32 stores the capsular work received by the registration interface section 31.

The distribution interface section 33 performs communications for transmitting a list of works stored in the capsular work storing section 32 to the audiovisual apparatus 4 and communications for transmitting, to the audiovisual apparatus 4, a capsular work which meets the request sent from the audiovisual apparatus 4.

The audiovisual apparatus 4 has a user input section 41 which includes a keyboard, a mouse, etc., a user output section 42 such as a monitor, a reproducing processing section 43, a ticket interface section 44, a ticket storing section 45, a capsular work interface section 46, a capsular work storing section 47 and a decapsulating section 48.

The reproducing processing section 43 reproduces the work data acquired from the decapsulating section 48. The input and output of the work data are performed through the user input section 41 and the user output section 42, respectively.

The ticket interface section 44 performs communications for receiving a ticket from the ticket server apparatus 2, in accordance with the capsular work and its usage which have been requested by the user.

The ticket storing section 45 stores the ticket acquired from the ticket interface section 44.

The capsular work interface section 46 performs communications for receiving the list of works from the distribution center apparatus 3 and communications for receiving a work, selected by the user on the basis of the list, from the distribution center apparatus 3.

The capsular work storing section 47 stores the capsular work acquired from the capsular work interface section 43.

The decapsulating section 48, which has a decrypting subsection 481, acquires the capsular work requested by the user from the capsular work storing section 47, acquires the ticket for the capsular work from the ticket storing section 45, and decrypts the capsular work containing the work data through the decrypting subsection 481 by using the acquired ticket.

In the work distribution system illustrated in FIG. 1, the editing apparatus 1 and the ticket server apparatus 2 are connected to each other via a network such as the Internet, as well as the editing apparatus 1 and the distribution center 3, the ticket server apparatus 2 and the audiovisual apparatus 4, and the distribution center apparatus 3 and the audiovisual apparatus 4.

Figure 2:
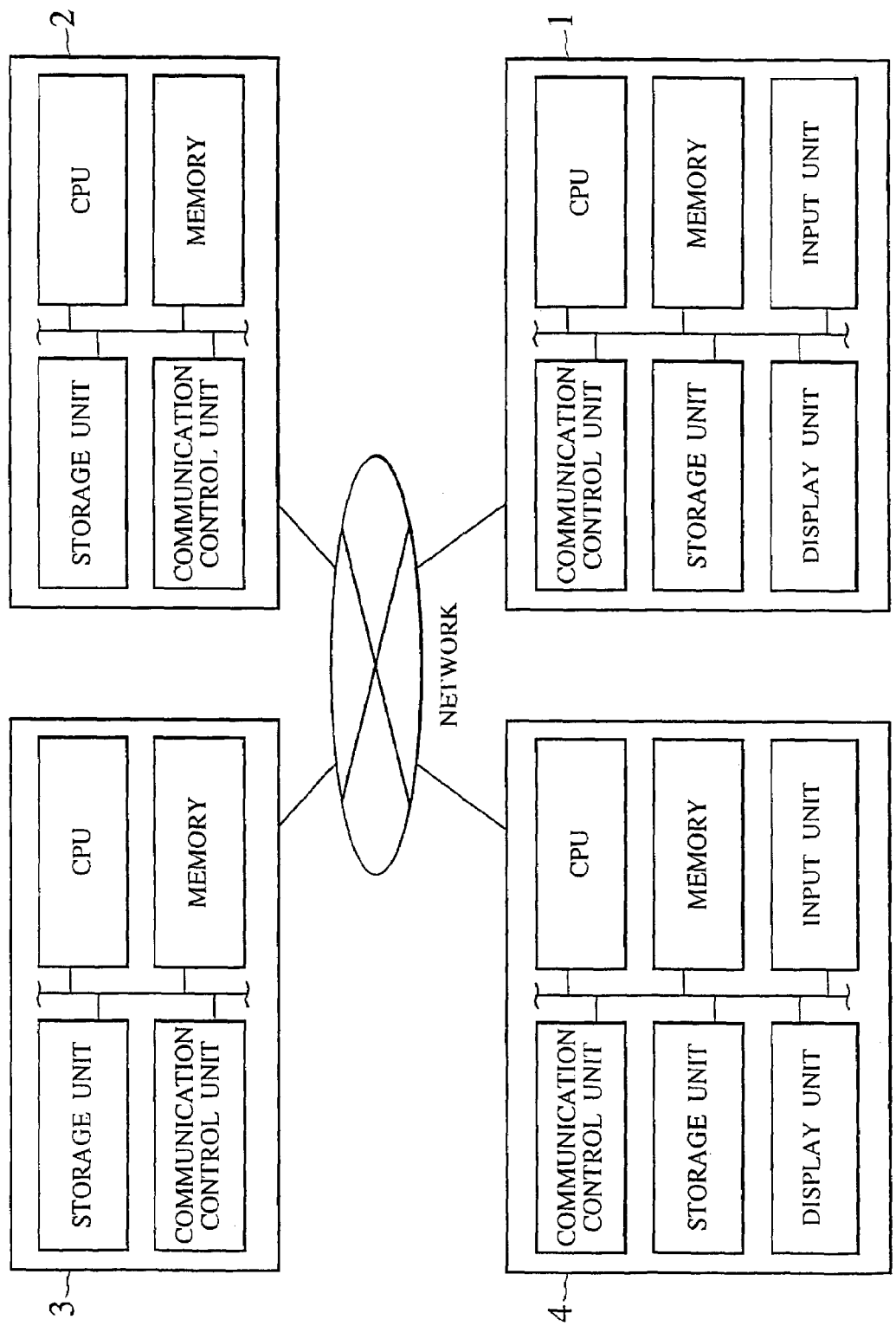
FIG. 2 is a diagram showing the hardware structure of the work distribution system according to the first embodiment of the present invention.

FIG. 2 illustrates the hardware structure of the work distribution system shown in FIG. 1. With the illustrated structure, the above-described functions of the respective apparatuses are realized.

The operations performed in the first embodiment will now be described.

Figure 3:
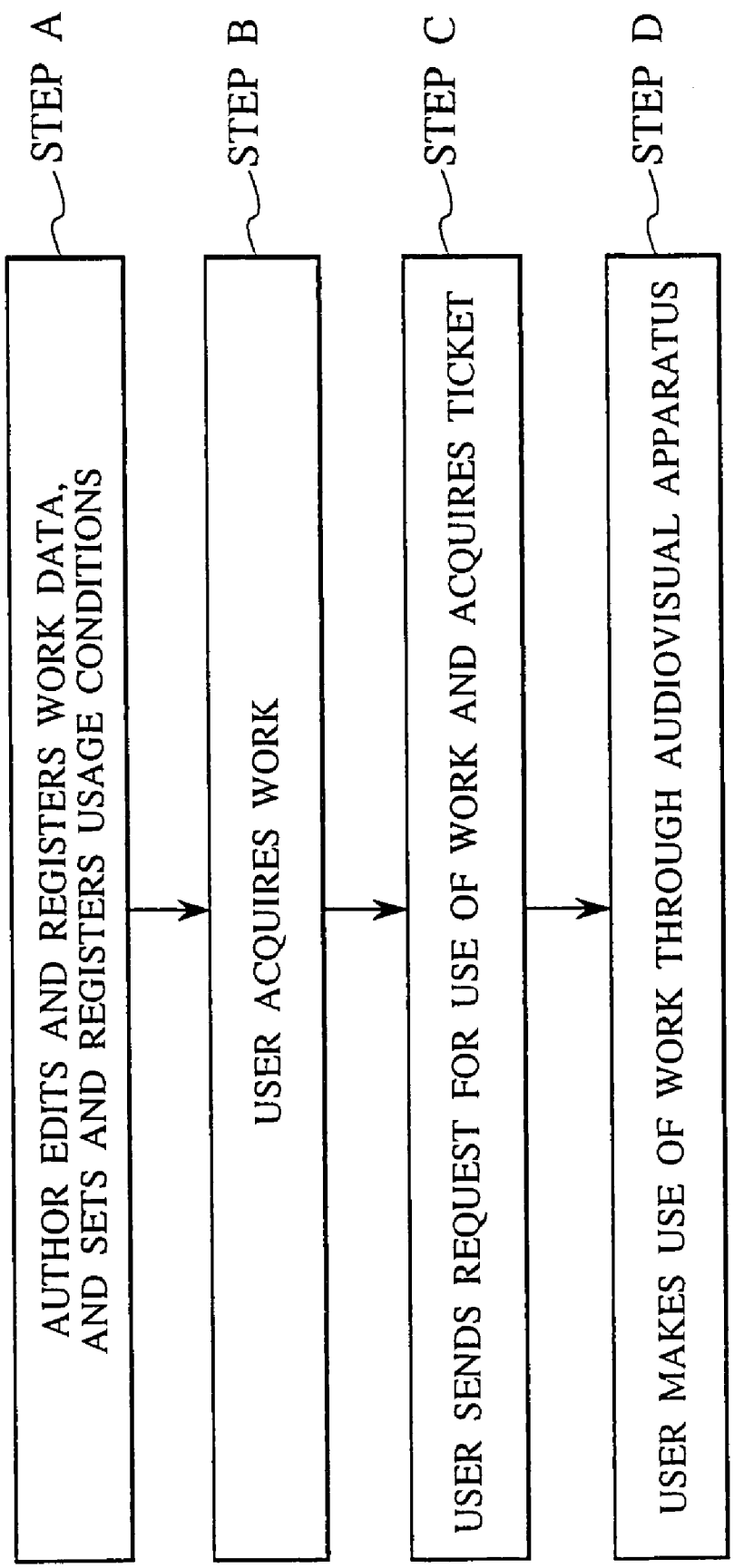
FIG. 3 is a flowchart which schematically shows operations performed in the first embodiment of the present invention.

Firstly the entire operation flow in the first embodiment will be explained with reference to FIG. 3.

The author edits the work data with the editing apparatus 1, registers the edited work data in the distribution center apparatus 3, sets the usage conditions through the editing apparatus 1, and registers the usage conditions in the ticket server apparatus 2 (step A).

Next the user acquires the desired work from the distribution center apparatus 3, and stores it in the audiovisual apparatus 4 (step B). Furthermore, the user sends a request for use of the work to the ticket server apparatus 2, acquires a ticket for the work therefrom and stores the ticket in the audiovisual apparatus 4 (step C). Then, the user makes use of the work through the audiovisual apparatus 4 (step D).

Figure 4:
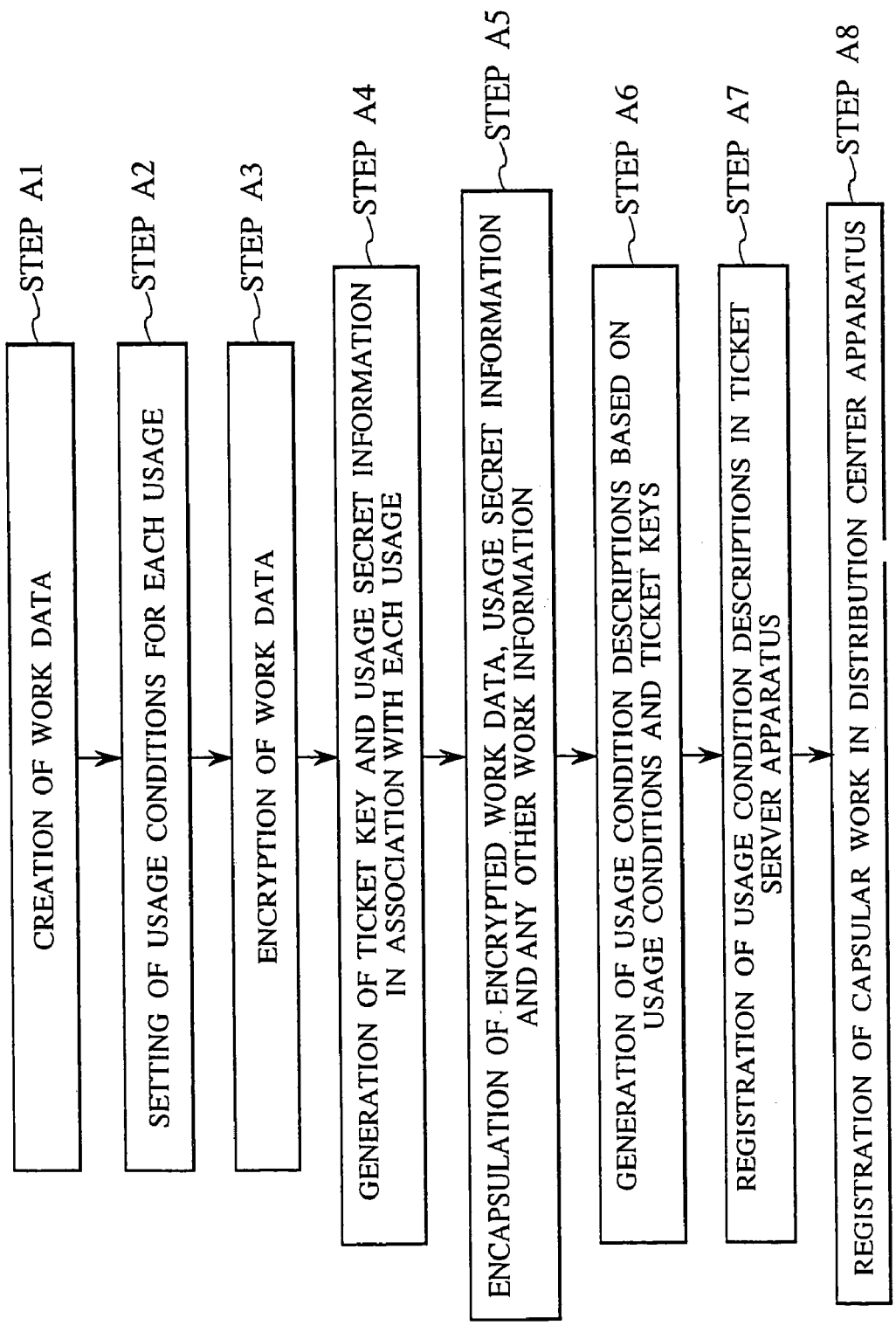
FIG. 4 is a flowchart showing the operations of an editing apparatus according to the first embodiment of the present invention.

The process carried out by step A shown in FIG. 3 will be described in more detail with reference to FIG. 4.

The author creates the work data by using the editing apparatus 1. The editing processing section 14 has a function similar to that of common multimedia authoring software, and is capable of creating works in a dialogic manner (step A1).

Then, the author sets the usage conditions to the work to be distributed. This operation is controlled by the usage condition setting section 13, and a dialog such as that illustrated in FIG. 7 is displayed on the user output section 12. Operating the user input section 11, the author sets the usage conditions for each usage in accordance with the procedures shown in FIG. 8 (step A2).

Next, the author creates the capsular work based on the work data and the usage conditions.

Firstly, the encrypting section 151 encrypts the work data in accordance with random number R acquired from the random number generating section 153 (step A3). If a common key cryptographic system is employed in this case, the time required for the encryption and decryption procedures can be reduced.

Figure 9:
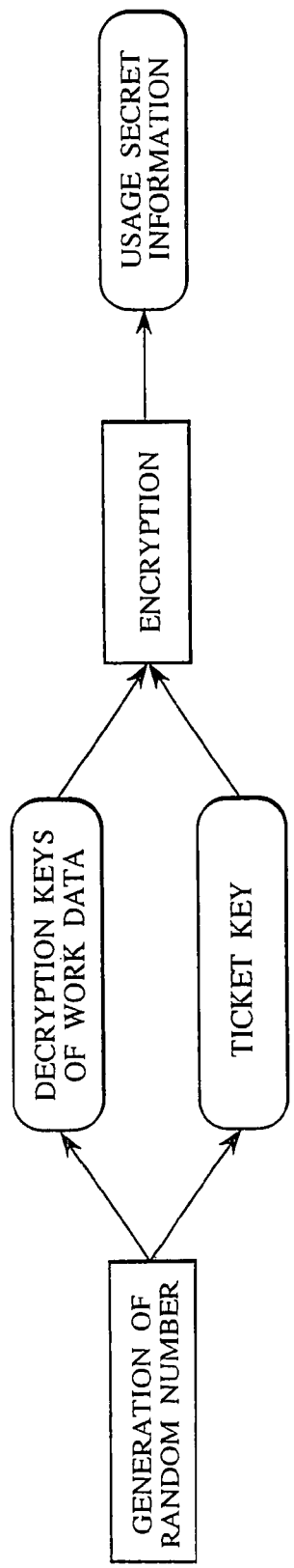
FIG. 9 is a diagram showing the operation of generating usage secret information.

Acquiring random numbers Ru from the random number generating section 153, the ticket key generating section 152 encrypts the decryption key R of the work data by using random numbers Ru one after another as a key, thus obtaining usage secret information E [Ru] (R) in association with each of the usages for which the usage conditions have been set (step A4). FIG. 9 schematically illustrates those procedures.

Here, formula E [K] (D) represents the result of encrypting data D with key K. A similar representation will be hereinafter adopted.

Figure 11:
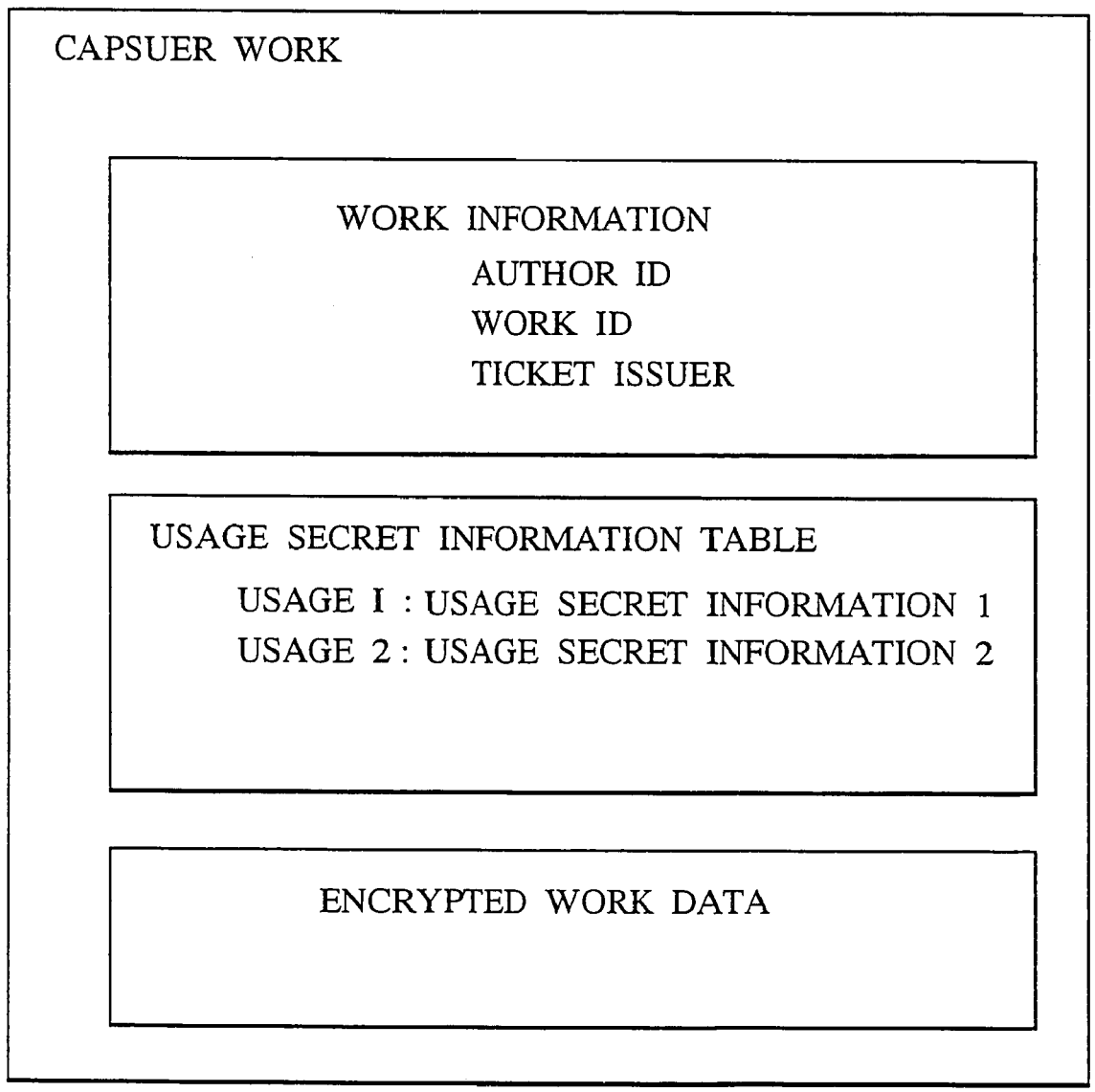
FIG. 11 is a diagram exemplifying the structure of a capsular work according to the first embodiment of the present invention.

Next, a table which contains combinations each being made up of one of the plural usages and the corresponding usage secret information is created as shown in FIG. 10. This table will be hereinafter referred to as the usage secret information table. Then, the usage secret information table, the encrypted work data and work information which specifies author ID representing the author's name, work ID representing the name of the work, and the ticket issuer, etc. are combined to generate a capsular work having such a structure as that illustrated in FIG. 11 (step A5).

Figures 12A, 12B:
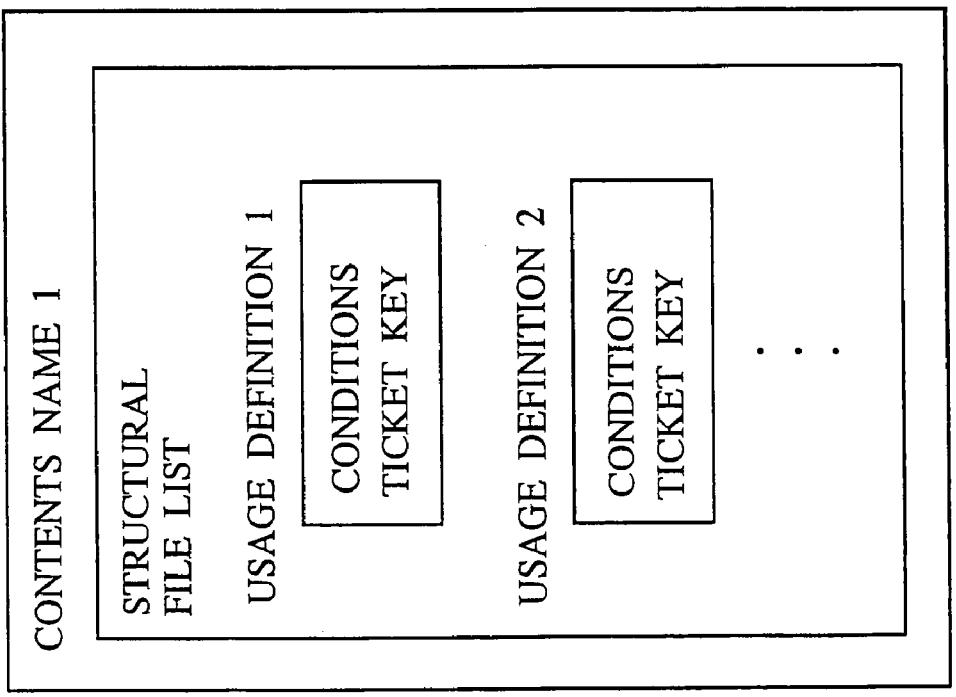
FIGS. 12(*a*) and 12(*b*) are diagrams showing the structure of a usage condition description and an example of the usage condition description when written in an access control language.

Furthermore, the usage conditions which have been set thus are translated into formal descriptions in an access control language as shown in FIGS. 12(a) and 12(b) (step A6). In the descriptions written in the access control language, the available usages are declared in relation to each of the objects contained in a work, and the usage conditions are declared in relation to each usage. The ticket keys Ru are embedded in the declarations relating to the usages. More specifically, an ID which specifies an object is presented, and thereafter a character string which represents a usage is presented. Next, condition descriptions specifying a variety of usage conditions and parameters destined to the condition descriptions are listed and thereafter a ticket key is presented. Here, the "objects" indicate fundamental structural elements such as images and text.

In the case of setting more detailed usages such as "view in a monochrome display mode" and "view in a full-color display mode", etc. under the above-described circumstances, objects to be displayed in monochrome and objects to be displayed in full color, for example, may be prepared. When utilizing a specific function through the audiovisual apparatus 4, a ticket issuing request may be made in relation to an object suitable for the specific function.

Furthermore, in the case of organizing objects into a tree structure comprising a combination of fundamental structural elements and the whole work formed thereof, for example, the usage conditions which have been set to a higher-level object can be declared as those common to all lower-level objects belonging to the aforementioned higher-level object. According to the usage conditions in that case, an ID specifying the aforementioned higher-level object is presented, and thereafter an ID specifying any child object which descends directly from the aforementioned higher-level object is presented. Next, a character string which represents a usage is presented, and then a combination of a condition description and any parameters destined thereto is recited as in the previously mentioned case. However, the declaration of ticket keys for the lowest-level object or objects does not apply to higher-level objects.

Figure 13B:
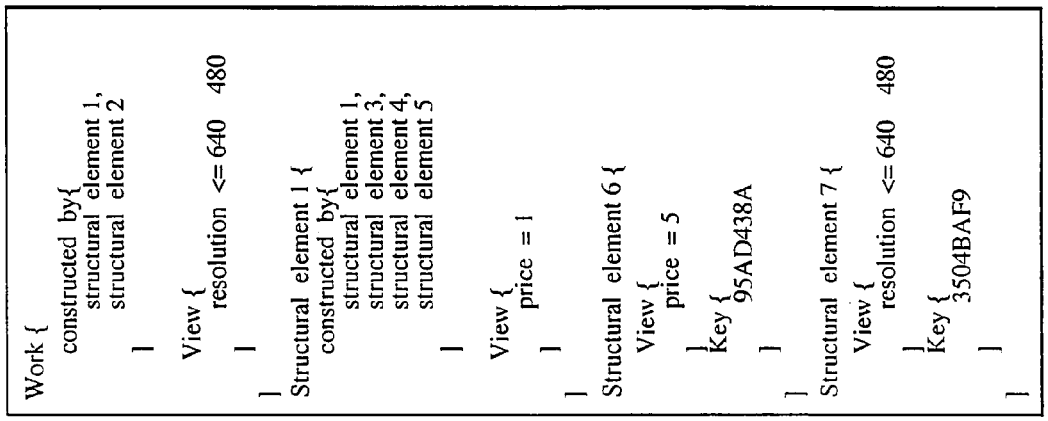
FIGS. 13(*a*) and 13(*b*) are diagrams showing a hierarchical structure in the case where a work contains a plurality of objects and exemplifying its usage condition description written in the access control language.
Figure 13A:
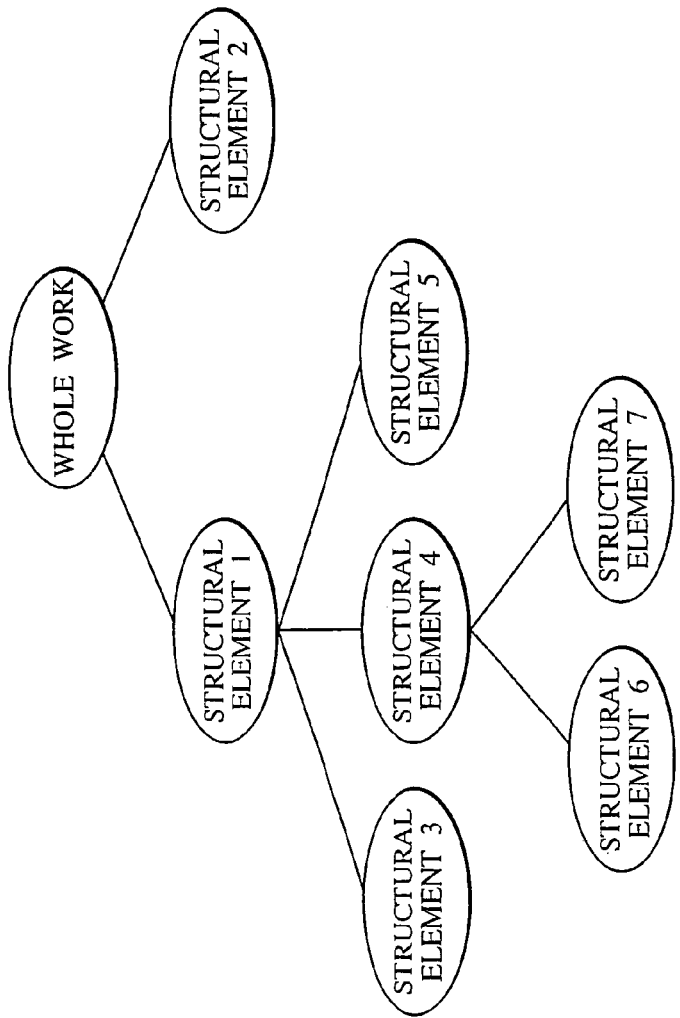

For example, let it be assumed that there is a work having structural elements 1 to 7, and the structural relationship between those elements is as shown in FIG. 13(a). In this case, the usage condition descriptions are as shown in FIG. 13(b).

In the case where the usage condition descriptions in such a form are interpreted by the ticket server apparatus 2, each object basically inherits the usage conditions declared in relation to any ascendant object thereof. However, in the case where a certain usage condition is presented for a higher-level object and a similar usage condition is presented for any descendant object thereof, the descendant object adopts the condition presented for itself.

Giving the example shown in FIGS. 13(a) and 13(b):
(1) the condition "the displayable resolution is 640×480 or lower" has been set to the whole work;
(2) the condition "the charge to be made per view is 1 dollar" has been set to the structural elements 3, 4 and 5; and
(3) the condition "the charge to be made per view is 5 dollars" has been set to the structural element 6.

In that case, the charge for use of the structural element 6 is 5 dollars, and the displayable resolution of the structural element 6 is 640×480 or lower.

Furthermore, in the example shown in FIGS. 13(a) and 13(b):
(4) the condition "the displayable resolution is 800×600 or less" has been set to the structural element 7.

Consequently, as seen from (1), (2) and (4), the charge to be made for use of the structural element 7 is 1 dollar, and the displayable resolution of the structural element 7 is 800×600 or less.

The usage condition descriptions thus generated are registered in the ticket server apparatus 2 through the registration interface section 16 (step A7).

Meanwhile, the capsular work is registered in the distribution center apparatus 3 through the registration interface section 16 (step A8).

Figure 5:
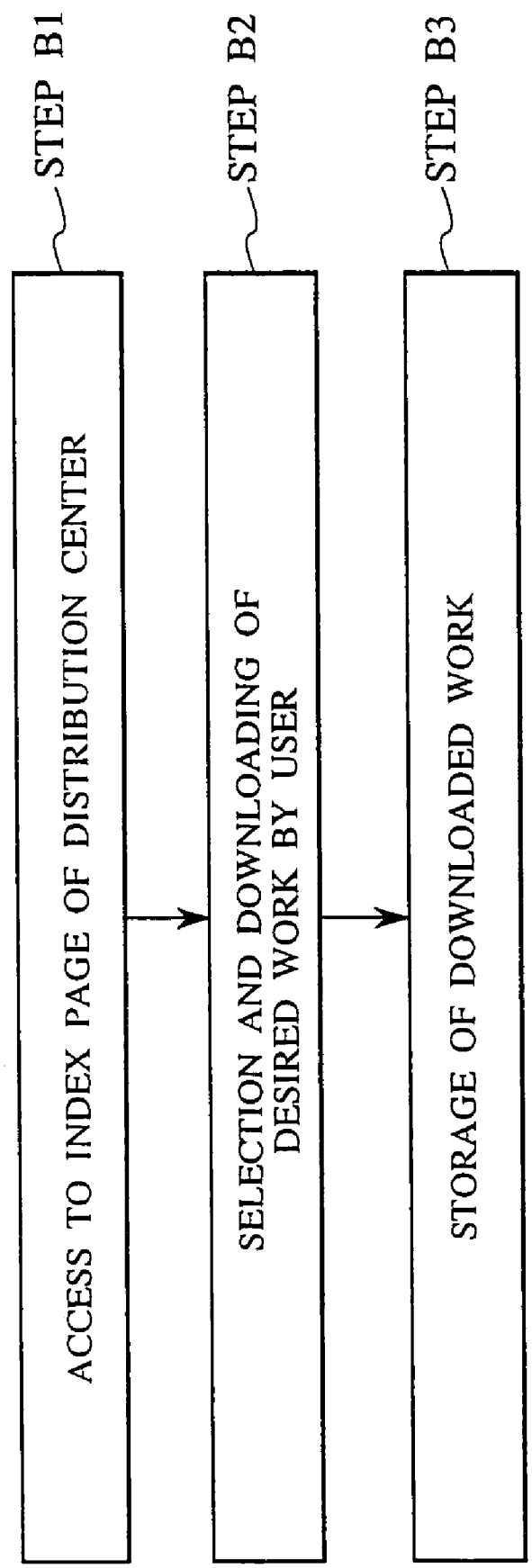
FIG. 5 is a flowchart showing communications between a distribution center apparatus and an audiovisual apparatus according to the first embodiment of the present invention.

Next the process carried out by step B shown in FIG. 3 will be explained in more detail with reference to FIG. 5.

Figure 14:
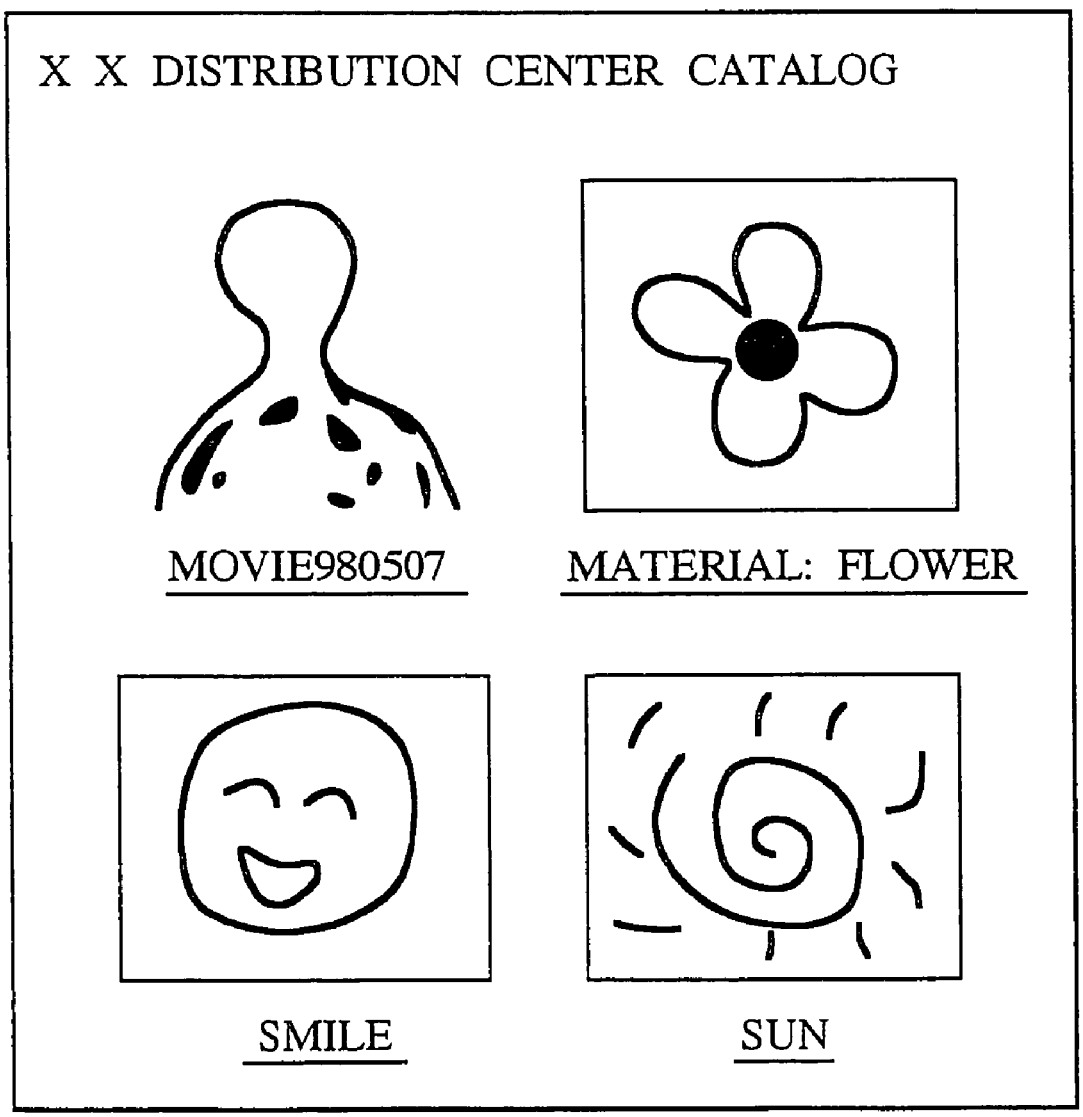
FIG. 14 is a diagram exemplifying a work index screen which is displayed on the audiovisual apparatus at the time of access to the distribution center apparatus.

The user accesses the distribution center apparatus 3 through the audiovisual apparatus 4 and acquires a catalog of works therefrom (step B1). At that time, an index screen such as that illustrated in FIG. 14, for example, is displayed on the user output section 42.

The user selects the desired work on the index screen (step B2). The index screen may have a link which has been set thereon so that the user can select the desired work on any other screen linked with the index screen. The audiovisual apparatus 4 sends a request for the selected work to the distribution center apparatus 3.

Having received the request from the audiovisual apparatus 4, the distribution center apparatus 3 acquires the capsular work which meets the request from the capsular work storing section 32, and transmits the acquired capsular work to the audiovisual apparatus 4 through the distribution interface section 33.

Having received the capsular work from the distribution center apparatus 3 through the capsular work interface section 46, the audiovisual apparatus 4 stores the received work in the capsular work storing section 47 (step B3).

Figure 6:
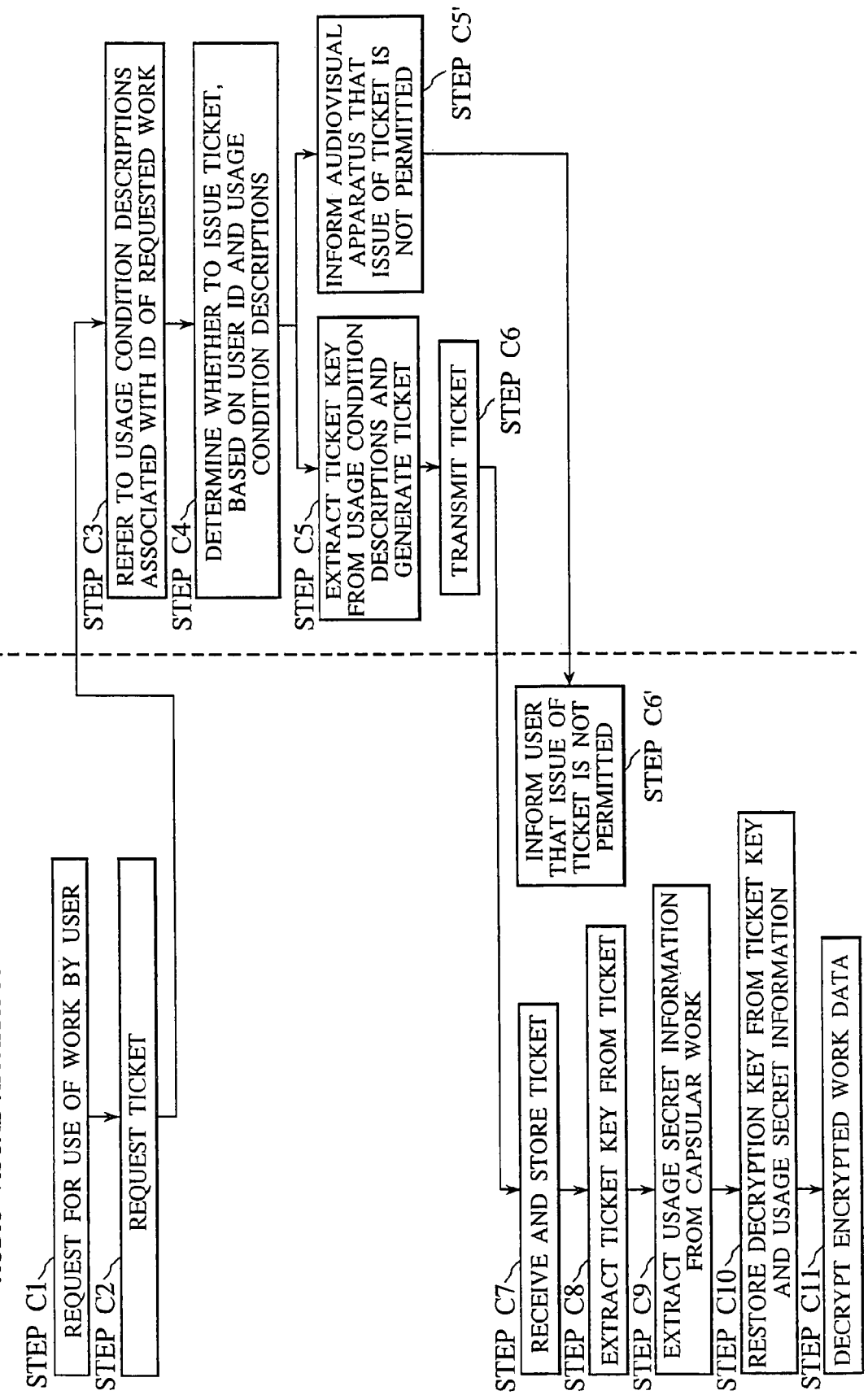
FIG. 6 is a flowchart showing communications between a ticket server apparatus and the audiovisual apparatus according to the first embodiment of the present invention.

Next, the process carried out by step C shown in FIG. 3 will be explained in more detail with reference to FIG. 6.

The user firstly makes a request for use of the capsular work stored in step B3 in the capsular work storing section 47 (step C1).

In order that the reproducing processing section 43 of the audiovisual apparatus 4 can perform the processing of practicing the usage designated by the user in relation to the capsular work stored in the capsular work storing section 47, the decapsulating section 48 divides the stored capsular work into work information, the usage secret information table and the encrypted work data. Having divided the capsular work as above, the decapsulating section 48 checks whether the required ticket has already been acquired or not. If the ticket has already been acquired, then the decapsulating section 48 decrypts the encrypted work data with the ticket. On the other hand, if the ticket has not yet been acquired, then the decapsulating section 48 makes a reference to the ticket issuer specified by the work information, and requests a ticket for the usage from the ticket issuer, i.e., the ticket server apparatus 2, through the ticket interface section 44 (step C2).

The request for the ticket contains information such as "author ID", "work ID", "requesting user ID", etc., specifying the work to be used and a usage thereof, and information such as "requesting date", for authenticating the dealing of the ticket, and the display performances, etc. such as the resolution and maximum number of colors of the user output section 42.

The ticket server apparatus 2, which has received the request from the audiovisual apparatus 4, makes a reference to the usage conditions stored in the usage condition storing section 22 in association with the requested target work (step C3).

Then, in the ticket server apparatus 2, the usage condition discriminating section 23 interprets the usage conditions and determines whether to issue a ticket for the usage in reply to the request sent from the audiovisual apparatus 4 (step C4).

For example, in the case where a "ticket issuable user ID list" showing the IDs of users for which tickets can be issued lists the user ID which is contained in the request, the usage condition discriminating section 23 determines to issue a ticket. On the other hand, in the case where it does not list the user ID which is contained in the request, the usage condition discriminating section 23 determines to issue no ticket. When the usage condition discriminating section 23 determines to issue no ticket, the ticket server apparatus 2 informs the audiovisual apparatus 4 that the issue of a ticket is not permitted (step C5'). Then, the audiovisual apparatus 4 informs the user, through the user output section 42, that the issue of a ticket is not permitted (step C6'). In this case, the user cannot practice the usage of the work.

In the case where the usage condition discriminating section 23 determines to issue a ticket, the ticket generating section 24 makes a reference to the block corresponding to the designated usage recited in the usage condition descriptions, and acquires a ticket key from that block. Then, the ticket generating section 24 generates a ticket which meets the request (step C5). This ticket contains information such as "work ID", "user ID", "ticket serial number", "ticket key", "permitted usage", "issue date" and "validity term" as shown in FIG. 15, for example.

The ticket encrypting section 25 encrypts the generated ticket so that only the audiovisual apparatus 4 on the part of the user can decrypt it. Then, the distribution interface section 26 transmits the encrypted ticket to the audiovisual apparatus 4 (step C6). In this case, it is preferred that the ticket be encrypted adopting a public key encryption system. However, a session key which differs depending on request may be generated in accordance with a Diffie-Hellman key protocol, and the ticket may be encrypted adopting the common key cryptographic system.

In the audiovisual apparatus 4, the ticket interface section 44 receives the ticket, decrypts the ticket with either a user's secret key or the aforementioned session key, and stores the decrypted ticket in the ticket storing section 45 (step C7).

The decapsulating section 48 refers to the ticket for the usage and a predetermined block (e.g. a "view" block) of the usage secret information table (step C8), and extracts ticket key Ru and usage secret information E [Ru] (R) from the ticket and the block, respectively (step C9). Then, in the decapsulating section 48, the decrypting subsection 481 restores decryption key R for the work by decrypting usage secret information E [Ru] (R) with ticket key Ru (step C10).

Thereafter, in the decapsulating section 48, the decrypting subsection 481 decrypts the encrypted work data with the decryption key R, thereby restoring the work data (step C11).

Next, the process carried out by step D will be explained.

The reproducing processing section 43 has a nonvolatile memory in which the work data as encrypted by the prior step is temporarily stored. The reproducing processing section 43 also processes the work data, while carrying on a dialog with the user through the user input section 41 and the user output section 42.

According to the first embodiment, as described above, the encrypted work and the usage secret information, etc. are encapsulated together and distributed over a network such as the Internet. The usage secret information is not a decryption key itself of the encrypted work data, and a ticket is necessary to attain the decryption key. Therefore, the capsular work can be copied freely and can be exchanged between any users, without necessarily asking the distribution center apparatus 3. This leads to an improvement in a work distribution speed and the enlargement of a distribution area. Moreover, since tickets are generated each for one of the plural usages, the ticket price is lower than in the case where tickets are generated each for some usages, which contributes toward the promotion of the use of works.

Second Embodiment

Figure 16:
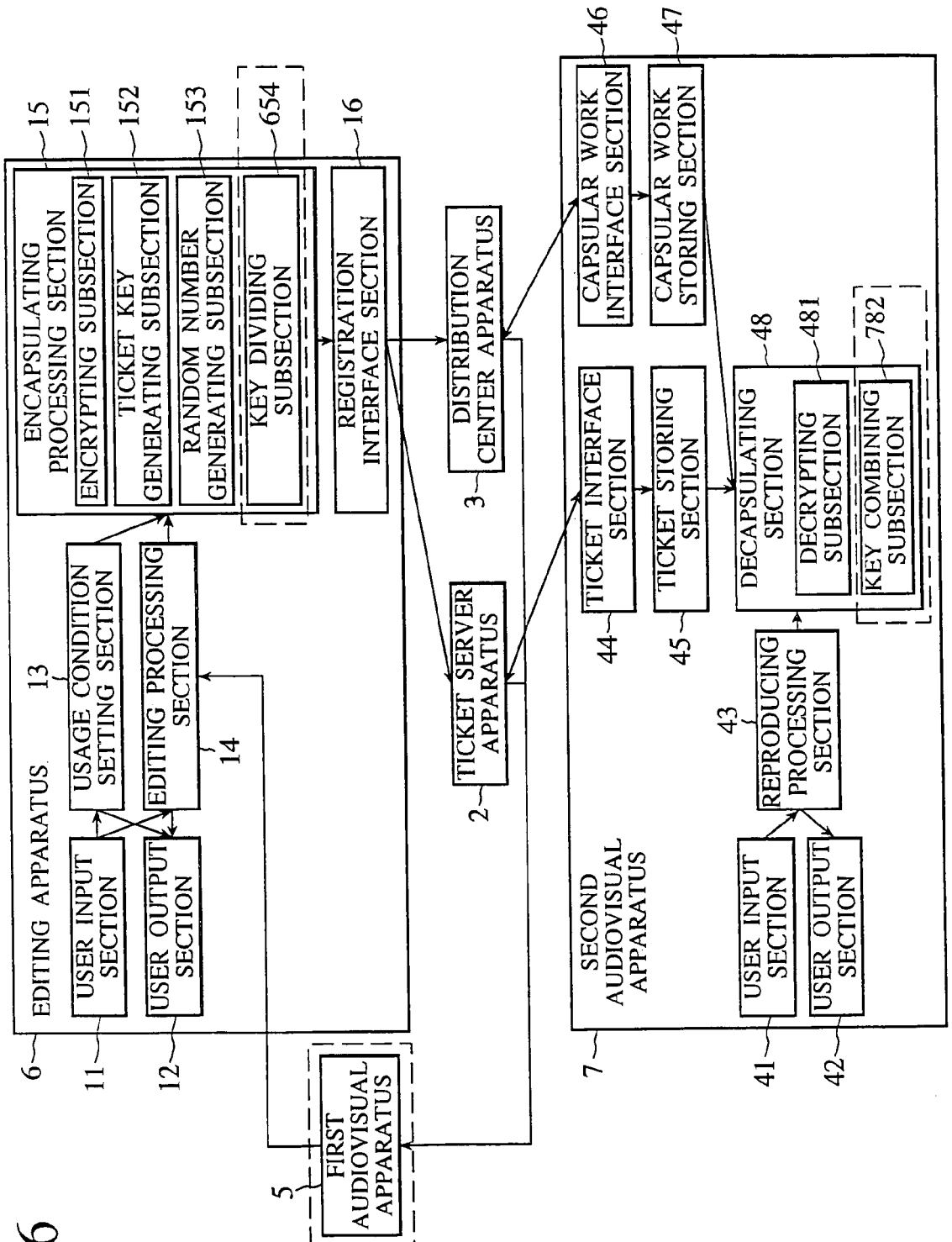
FIG. 16 is a block diagram illustrating the structure of a work distribution system according to the second embodiment of the present invention.

Referring now to FIG. 16, a work distribution system according to the second embodiment of the present invention differs from that of the first embodiment in the point that the work distribution system of the second embodiment includes a first audiovisual apparatus 5, in addition to the apparatuses illustrated in FIG. 1. The work distribution system of the second embodiment further differs from that of the first embodiment in the point that the encapsulating processing section 15, included in an editing apparatus 6 of the work distribution system of the second embodiment, has a key dividing subsection 654 in addition to the structure of the encapsulating processing section 15 included in the editing apparatus 1 of the first embodiment. Moreover, a second audiovisual apparatus 7 of the second embodiment differs from the audiovisual apparatus 4 of the first embodiment in the point that the decapsulating section 48, included in the second audiovisual apparatus 7 of the second embodiment, has a key combining subsection 782 in addition to the structure of the decapsulating section 48 included in the audiovisual apparatus 4 of the first embodiment.

The first audiovisual apparatus 5 has basically the same structure as the audiovisual apparatus 4 of the first embodiment shown in FIG. 1, except that the first audiovisual apparatus 5 is capable of transmitting the work data decrypted by the decapsulating section 48 to the editing processing section 14 of the editing apparatus 6, in accordance with an instruction from the user input section 41.

In the case of creating, with the encapsulating processing section 15, a secondary capsular utilizing the work data which has been attained by reediting, through the editing processing section 14, the first capsular work acquired from the first audiovisual apparatus 5, the key dividing subsection 654 of the editing apparatus 6 generates a second ticket key for the secondary capsular work, based on the first ticket key for the first capsular work and a predetermined key (original ticket key) acquired from the random number generating subsection 153.

In order to make use of the secondary capsular work, the key combining subsection 782 of the second audiovisual apparatus 7 restores the original ticket key from the first and second ticket keys.

In the work distribution system of the second embodiment, the first audiovisual apparatus 5 and the editing apparatus 6 are connected to each other via a network such as the Internet. Furthermore, the first audiovisual apparatus 5 and the second audiovisual apparatus 7 are connected respectively to the ticket server apparatus 2 and the distribution center apparatus 3 through the network such as the Internet.

The operations performed in the second embodiment will now be described.

Figure 17:
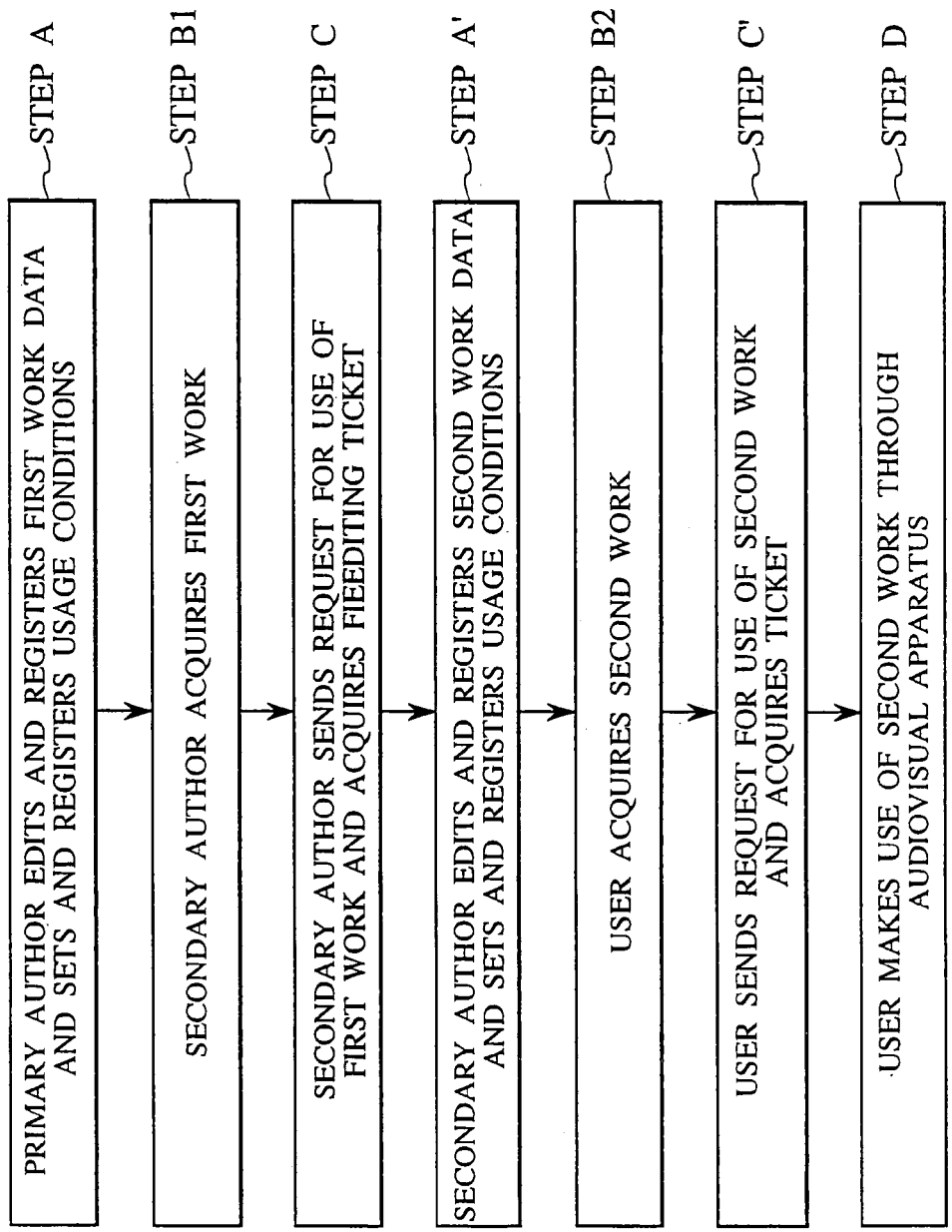
FIG. 17 is a flowchart which schematically shows operations performed in the second embodiment of the present invention.

Firstly, the whole operation flow of the second embodiment will be briefly explained with reference to FIG. 17.

A primary author creates a first capsular work in the same manner as in the case of the first embodiment (step A).

A secondary author acquires the first work through the first audiovisual apparatus 5, as in the case of the first embodiment (step B1). Then, the secondary author inputs a reediting request to the first audiovisual apparatus 5. The first audiovisual apparatus 5, to which the request has been input by the secondary author, requests a predetermined reediting ticket from the ticket server apparatus 2, as in the case of the audiovisual apparatus 4 of the first embodiment.

The ticket server apparatus 2, which has received the request for the reediting ticket, discriminates the usage conditions in reediting, and transmits the reediting ticket to the first audiovisual apparatus 5 when the ticket server apparatus 2 determines to allow the secondary user to perform reediting. The secondary author thus acquires the reediting ticket (step C). Furthermore, the secondary author edits the work data with the editing apparatus 6, and registers the edited work data in the distribution center apparatus 3. Moreover, with the editing apparatus 6, the secondary author also sets usage conditions for usages of the secondary work, and registers those usage conditions in the ticket server 2 (step A').

Next, a user acquires the second capsular work through the second audiovisual apparatus 7 (step B2). Furthermore, the user makes a request for use of the second capsular work, acquires a ticket for the work, and stores the ticket in the audiovisual apparatus 7 (step C). The reproducing processing section 43 reproduces the work data in the same manner as in the case of the first embodiment (step D).

Figure 18:
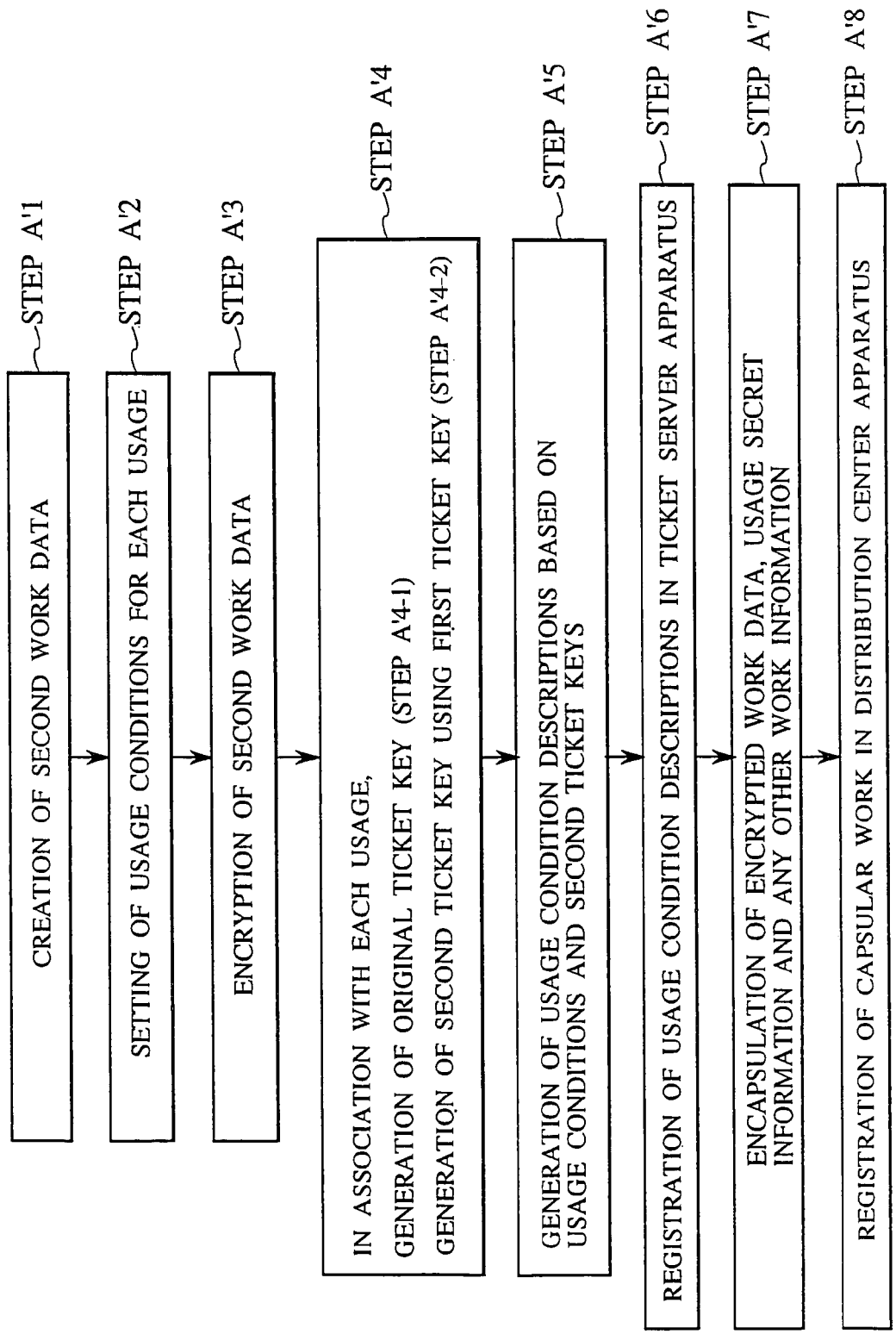
FIG. 18 is a flowchart showing the operations of a first audiovisual apparatus and of an editing apparatus according to the second embodiment of the present invention.
Figure 19:
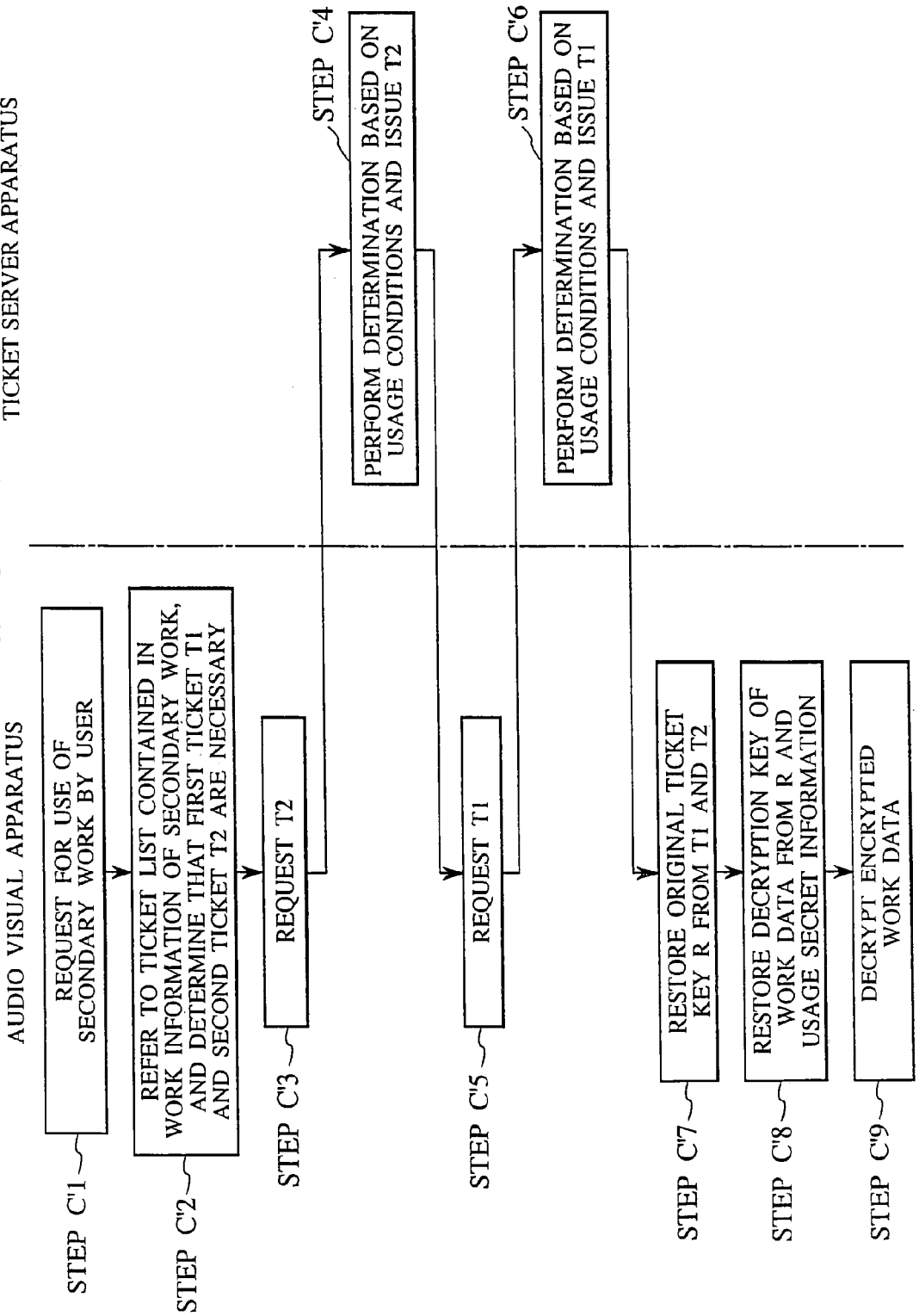
FIG. 19 is a flowchart showing communications between a ticket server apparatus and a second audiovisual apparatus according to the first embodiment of the present invention.

The process carried out by step A' shown in FIG. 17 will now be explained in more detail with reference to FIG. 18.

As well as the audiovisual apparatus 4 of the first embodiment, the first audiovisual apparatus 5 which has received the reediting ticket decrypts the first work data by using the reediting ticket, and transmits the first work data to the editing apparatus 6. Thereafter, the secondary author reedits the work data with the editing processing section 14 of the editing apparatus 6, thereby creating the second work data (step A'1).

With the usage condition setting section 13, the secondary author sets the usage conditions to the secondary work data in the same manner as in the case of the first embodiment (a step A'2). Utilizing the encrypting subsection 151 and the random number generating subsection 153, the editing apparatus 6 encrypts the secondary work data (a step A'3).

Thereafter, in association with one of the plural usages for which the usage conditions have been set, the editing apparatus 6 acquires first ticket T1 for the first capsular work from the ticket server 2, and then acquires second ticket T2 in the following manner:

Firstly, random number R which the ticket key generating subsection 152 needs in order to generate second ticket T2, is generated by the random number generating subsection 153 (step A'4-1). This random number will hereinafter be referred to as the original ticket key.

Figure 20:
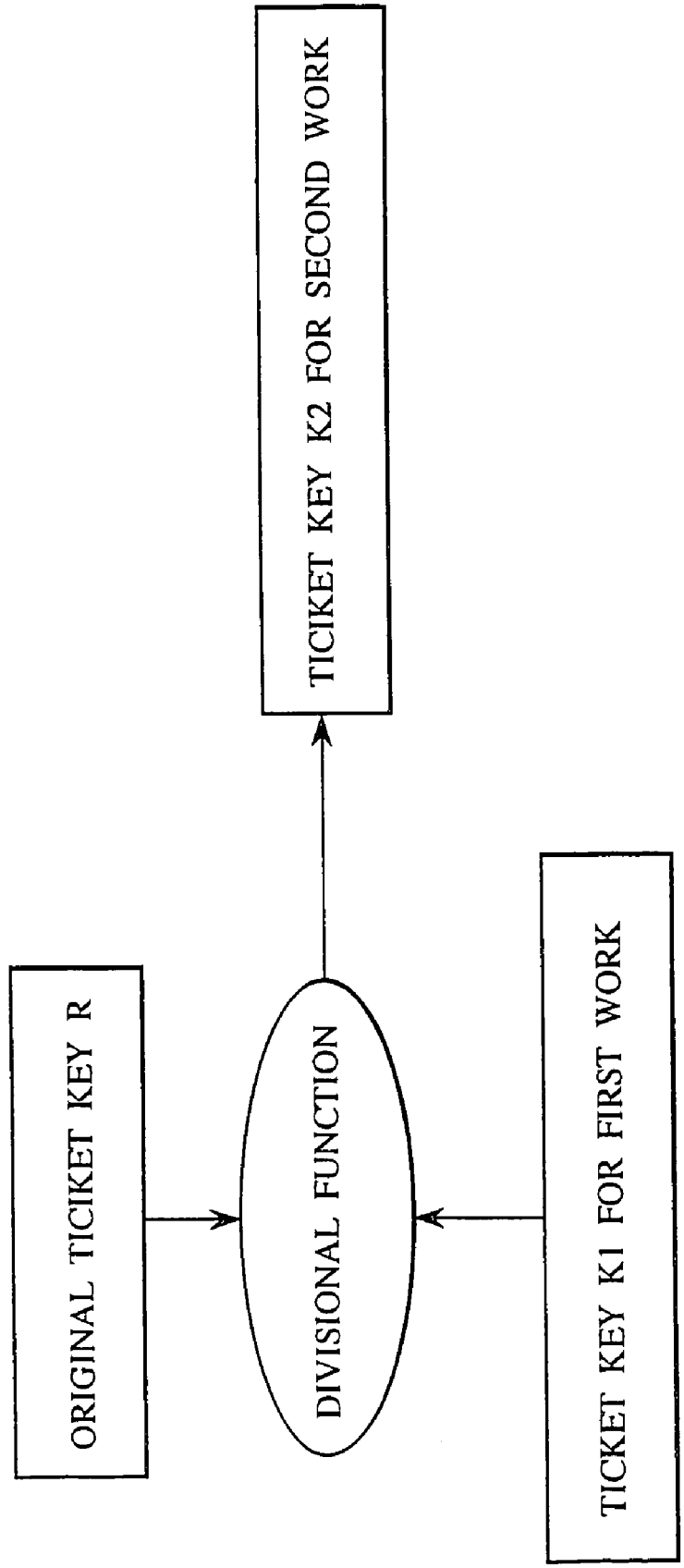
FIG. 20 is a diagram showing the generation of a second ticket key employing a divisional function.

Then, using original ticket key R and first ticket key K1 for first ticket T1, the key dividing subsection 654 derives ticket key K2 for second ticket T2 from Equation 1 (step A4-2). This procedure is schematically shown in FIG. 20.

$$K2 = f(K1, R) \quad \text{(Equation 1)}$$

Function "f" shown above satisfies both of following Equations 2 and 3 simultaneously:

$$|f(a, b)| \sim |a| \sim |b| \quad \text{(Equation 2)}$$

("|x|" represents the bit number of a positive integer x, while "~" indicates "approximately equal to".)

$$f(b1, b2) = f(b2, b1) \quad \text{(Equation 3)}$$

Furthermore, function f is such a function that there are inverse functions "inv" which satisfy following Equations 4 and 5 in the case of a=f(b1, b2).

$$b2 = finv(b1, a) = finv(a, b1) \quad \text{(Equation 4)}$$

$$b1 = finv(a, b2) = finv(b2, a) \quad \text{(Equation 5)}$$

Equation 6 shows a specific example of function f.

$$f(a, b) = a \, XOR \, b \quad \text{(Equation 6)}$$

(XOR represents an exclusive disjunction.)

In this case, f is equal to finv.

The usage secret information for each usage is generated after the generation of the second ticket key. More specifically, the encrypting section 151 effects encryption adopting decryption key K of the encrypted work data and original ticket key R, thereby obtaining the usage secret information for each usage (step A'4-3).

The second ticket keys generated in the above-described manner are embedded in the usage descriptions, as in the case of the first embodiment (step A'5), and is registered in the ticket server apparatus 2 (step A'6).

Figure 21:
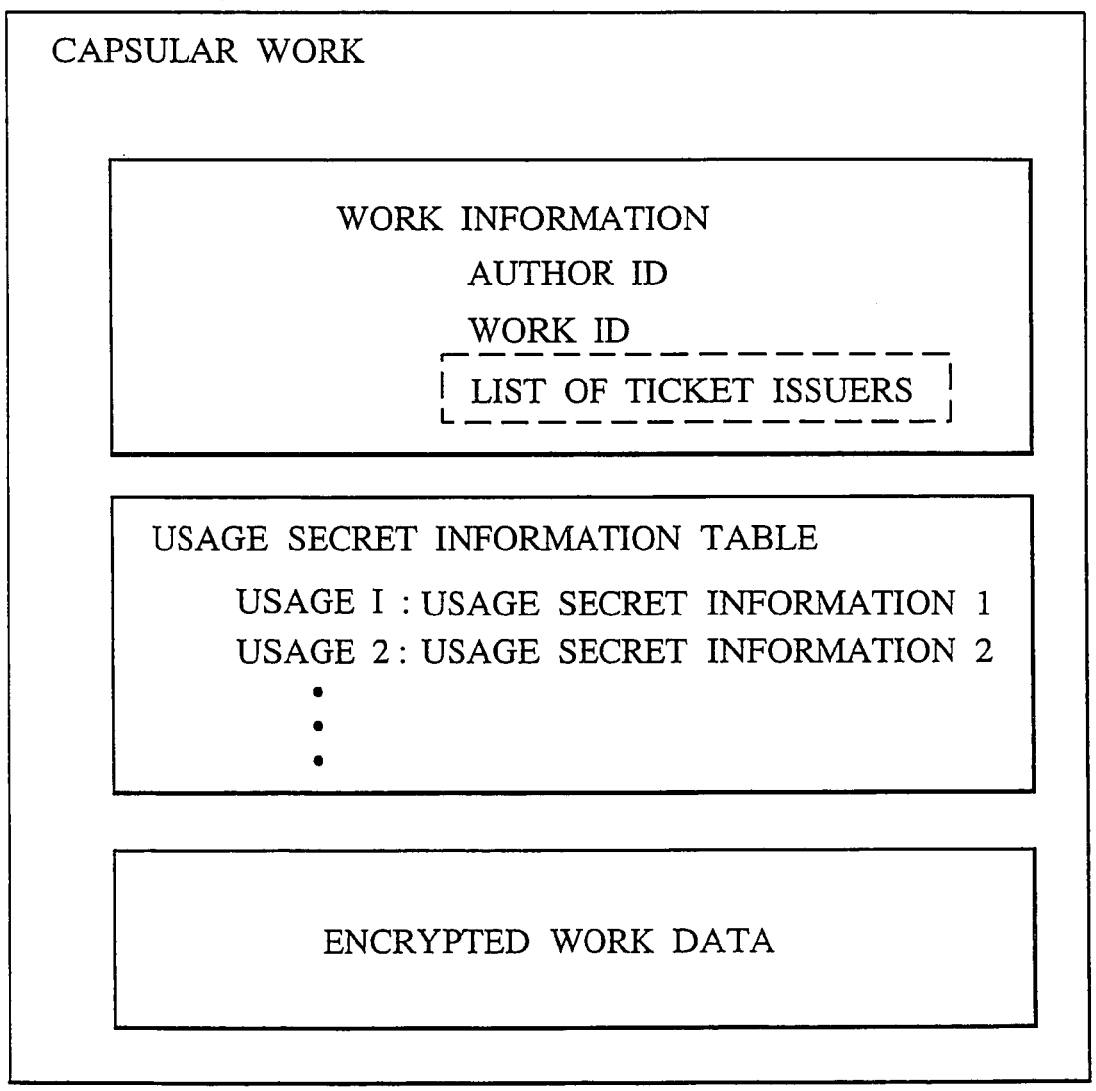
FIG. 21 is a diagram exemplifying the structure of a capsular work according to the second embodiment of the present invention.

Meanwhile, as in the case of the first embodiment, the usage secret information table is generated based on the usage secret information. Furthermore, a list of ticket issuers including not only the issuer of the second ticket, but also the issuer of the first ticket, is generated. The usage secret information table, the work information such as the list of ticket issuers, and the encrypted work data are combined to generate the second capsular work having such a structure as that shown in FIG. 21 (step A'7). The second capsular work as generated is registered in the distribution center apparatus 3 (step A'8).

Next, the process carried out by step C' shown in FIG. 17 will be explained in more detail with reference to FIG. 18.

The user makes a request for practicing desired usage of the second capsular work (step C'1). The second audiovisual apparatus 7 determines the required ticket with reference to the list of ticket issuers contained in the work information relating to the work (step C'2).

Firstly, the ticket interface section 44 requests the second ticket from the ticket server apparatus 2 (step C'3).

The ticket server apparatus 2, which has received the request for the second ticket, determines whether the usage requested by the second audiovisual apparatus 7 matches the usage conditions set to the second work, and transmits the second ticket key to the second audiovisual apparatus 7 when the usage requested by the second audiovisual apparatus 7 matches the usage conditions set to the second work (step C'4).

Next, the second audiovisual apparatus 7 similarly requests the first ticket from the ticket server apparatus 2 (step C'5). The ticket server apparatus 2 performs determination based on the usage conditions, and then transmits the first ticket (step C'6).

In order to decrypt the capsular work containing the work data, the decapsulating section 48 of the audiovisual apparatus 7 causes the key combining section 782 to extract first ticket key K1 and second ticket key K2 from the first and second tickets, and carries out calculation using Equation 7 (step C'7).

$$R' = finv(K1, K2) \quad \text{(Equation 7)}$$

In this case, original ticket key R satisfies Equation 8.

$$R' = R \quad \text{(Equation 8)}$$

Then, the decrypting subsection 481 restores decryption key K of the encrypted work data, using R' and a piece of usage secret information which corresponds to the usage, among pieces of usage secret information contained in the usage secret information table (step C'8).

Thereafter, the decrypting section 481 decrypts the second work data, using decryption key K and the encrypted work data (step C'9).

In to the second embodiment, since the tickets for the primary and secondary works are required at the same time in order to make use of the secondary work, the copyright protection of the secondary work is strengthened accordingly. Moreover, because the number of times the decryption is performed is only once, the lowering of the throughput of the reproducing process can be minimized also in the case of decrypting large-sized encrypted work data.

Third Embodiment

Figure 22:
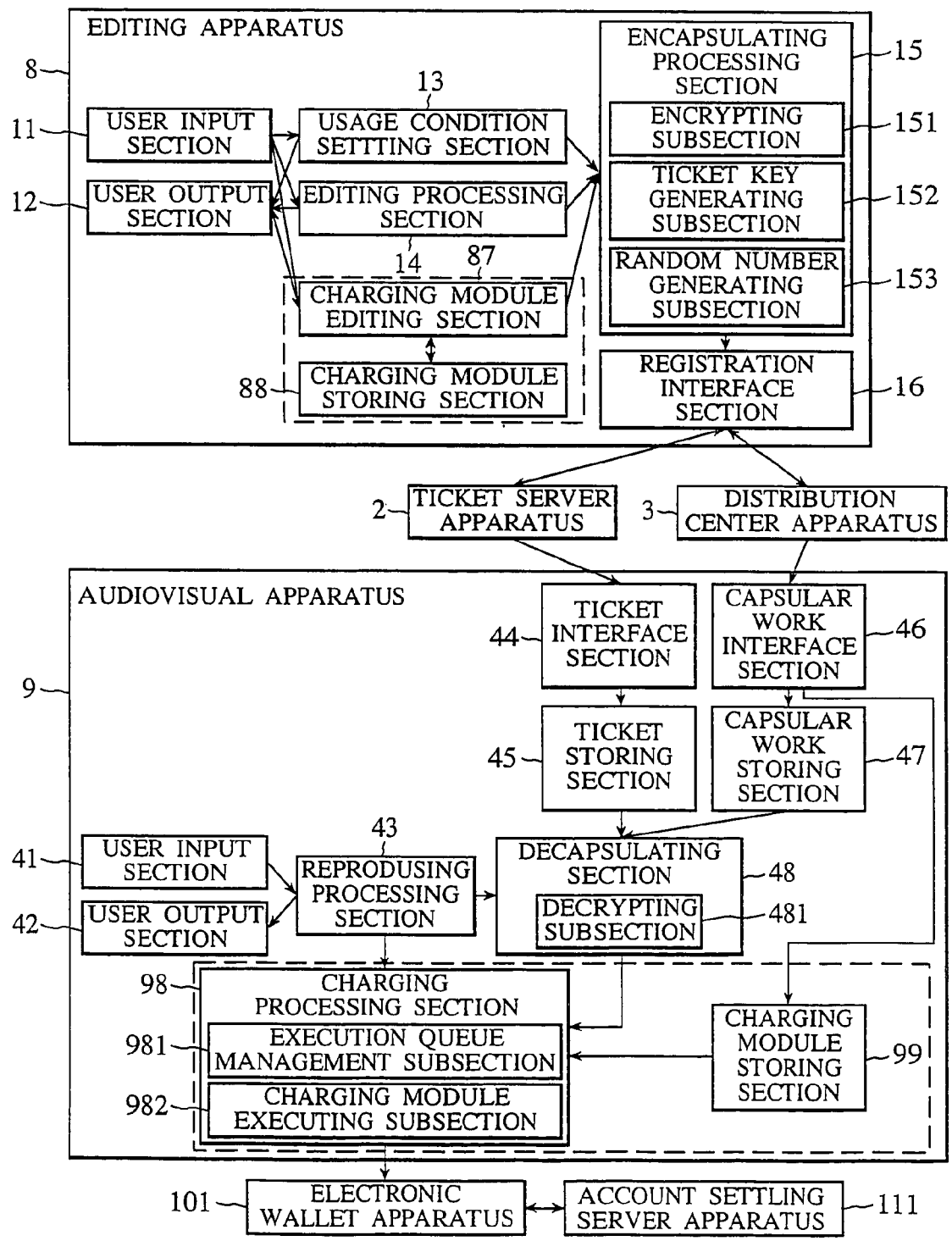
FIG. 22 is a block diagram showing the structure of a work distribution system according to the third embodiment of the present invention.

Referring now to FIG. 22, a work distribution system according to the third embodiment of the present invention differs from that of the first embodiment shown in FIG. 1 in the point that an editing apparatus 8, included in the work distribution system of the third embodiment, has a charging module editing section 87 and a charging module storing section 88 in addition to the structure of the editing apparatus 1 included in the work distribution system of the first embodiment. The work distribution system of the third embodiment further differs from that of the first embodiment in the point that an audiovisual apparatus 9, included in the work distribution system of the third embodiment, has a charging processing section 98 and a charging module storing section 99. The work distribution system of the third embodiment also differs from that of the first embodiment in that the work distribution system of the third embodiment has an electronic wallet apparatus 101 and an account settling server apparatus 111 in addition to the structure of the work distribution system according to the first embodiment shown in FIG. 1.

The charging module editing section 87 complies the source code of a charging module and generates an object code.

The charging module storing section 88 stores the object code of the charging module which has been generated by the charging module editing section 87.

The charging processing section 98 has an execution queue management subsection 981 and a charging module executing subsection 982, and executes a charging module stored in the charging module storing section 99.

The charging module storing section 99 stores charging modules encapsulated in a capsular work.

In the electronic wallet apparatus 101, a record for the charged amount generated by the audiovisual apparatus 9 is recorded as money to be paid, and regularly communicates with the account settling server apparatus 111 in order to perform account settling processing.

The account settling server apparatus 111 transmits account settling information to a predetermined financial agent through communications with the electronic wallet apparatus 101, and performs appropriate processing for depositing money into an account of a seller or an author.

In the work distribution system illustrated in FIG. 22, the electronic wallet apparatus 101 and the audiovisual apparatus 9 can be realized on the same computer machine. In that case, the electronic wallet apparatus 101 may have also the function of the account settling server apparatus 111.

The operations performed in the third embodiment will now be described.

Figure 23:
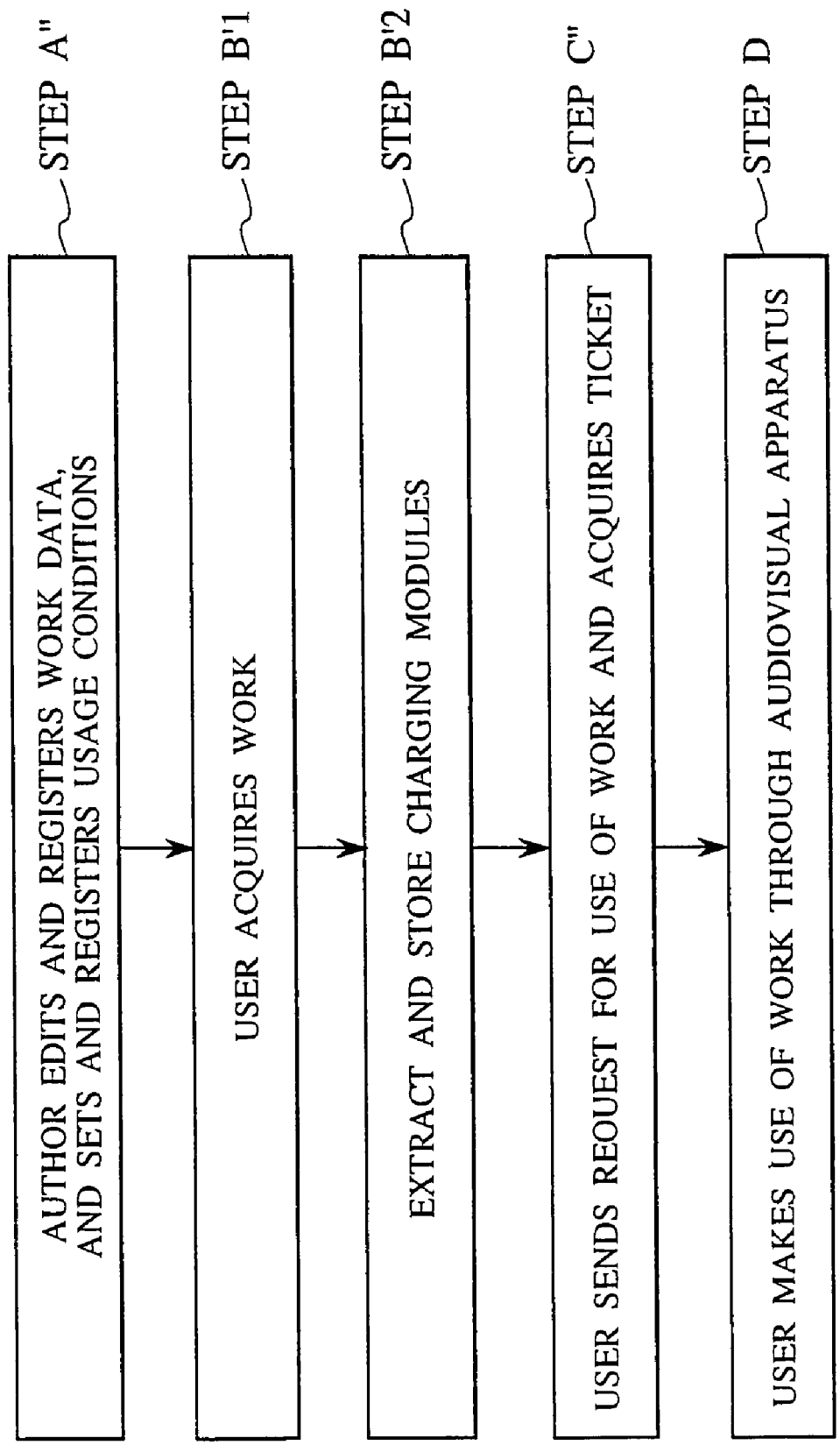
FIG. 23 is a flowchart which schematically shows operations performed in the third embodiment of the present invention.

Firstly, the whole operation flow of the third embodiment will be explained with reference to FIG. 23.

As in the case of the first embodiment, an author edits work data, registers the edited work data and sets usage conditions for usages of the work data. Furthermore, according to the third embodiment, the author also sets the charging method and the charged amount (step A").

Next, a user acquires capsulated work through the capsular work interface section 46 of the audiovisual apparatus 9 (step B'1). After the acquisition, the capsular work interface section 46 extracts charging modules from the capsular work, and stores the extracted charging modules in the charging module storing section 99. The capsular work, from which the charging modules have been extracted, is stored in the capsular work storing section 47 (step B'2).

The user makes a request for use of the work. The audiovisual apparatus 9 acquires a ticket for the work from the ticket server apparatus 2, and stores the ticket in the ticket storing section 45. Furthermore, the audiovisual apparatus 9 of the third embodiment also executes charging processing with respect to the capsular work (step C"). The reproducing processing section 43 reproduces the work data as in the case of the first embodiment, thus enabling the user to make use of the work data (step D).

Figure 24:
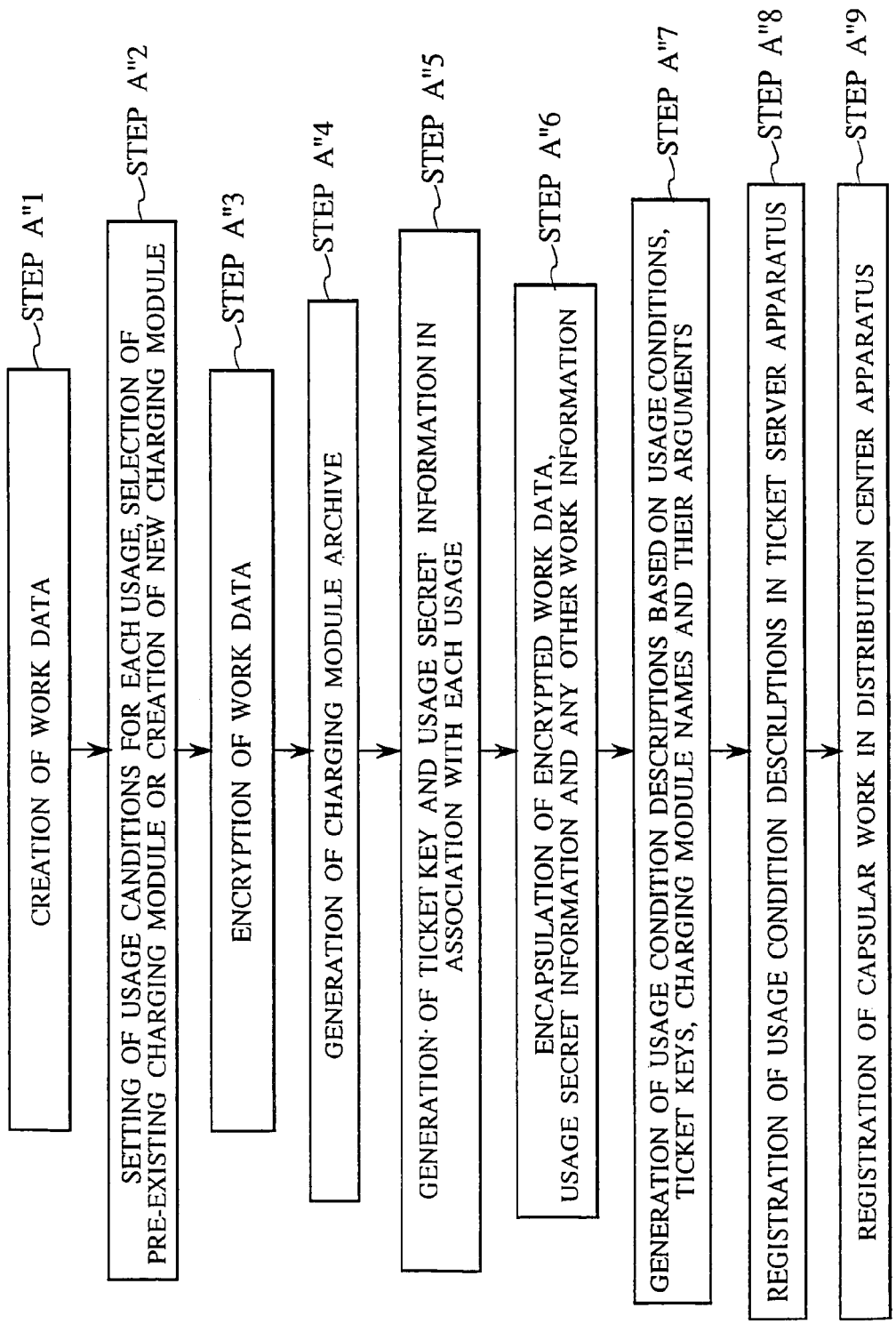
FIG. 24 is a flowchart showing the operations of an editing apparatus according to the third embodiment of the present invention.
Figure 25:
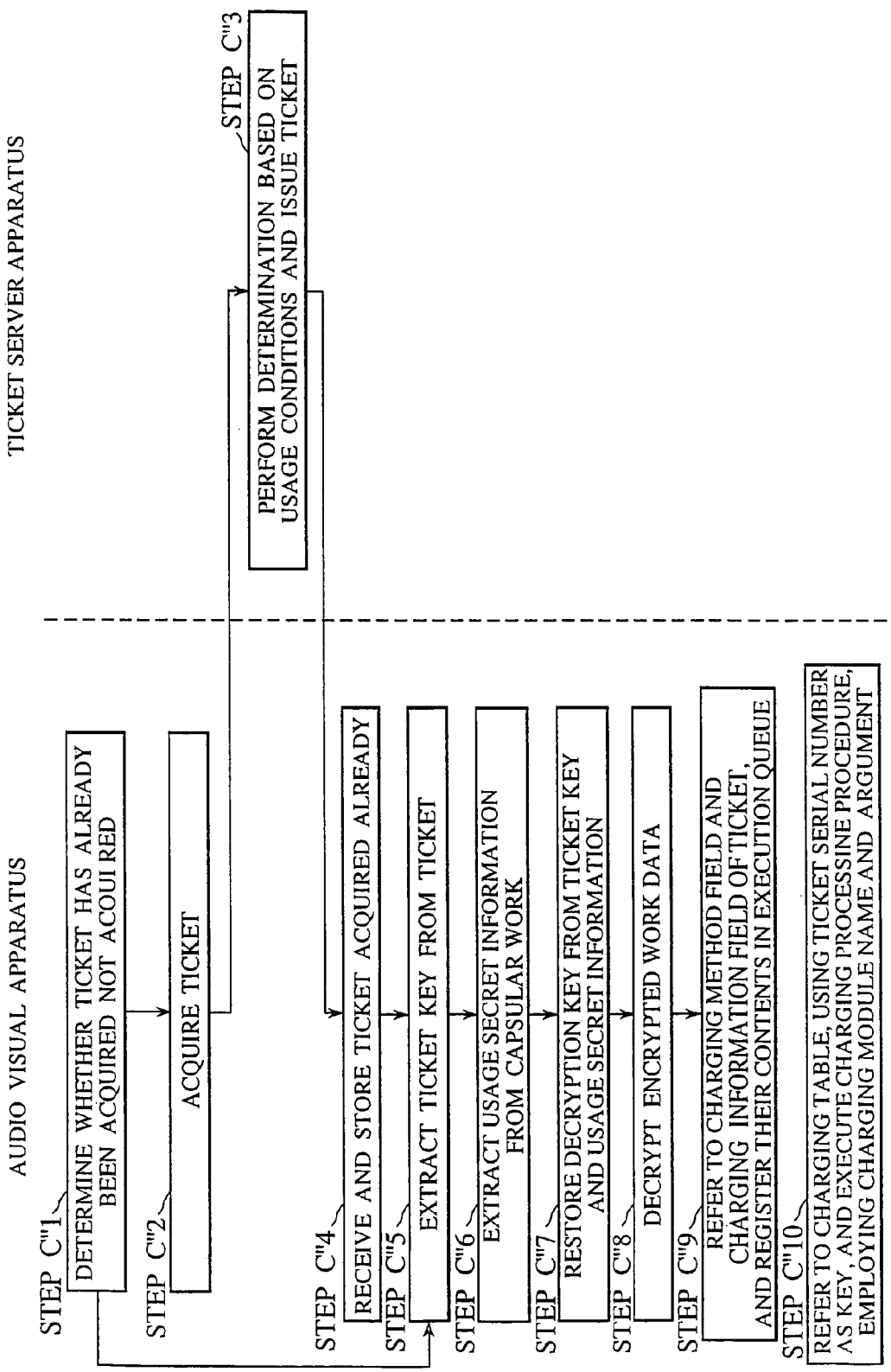
FIG. 25 is a flowchart showing communications between a distribution center apparatus and an audiovisual apparatus according to the third embodiment of the present invention.

Next, the process carried out by step A" shown in FIG. 23 will be explained in more detail, with reference to FIG. 24.

As in the case of the first embodiment, the author creates the work data with the editing apparatus 8 (step A"1). Then, the author sets the usage conditions for each usage through the usage condition setting section 13. In this case, in order to set the charging method and the charged amount in addition to the usage conditions, unlike in the case of the first embodiment, the author selects any appropriate charging module among those stored in the charging module storing section 88. If there is no appropriate charging module, then the user can create a new module through the charging module editing section 87 and can use it. Thereafter, the author sets the charged amount and details of parameters to be adopted in the charging method. The contents which have been set by the author are converted to arguments to be applied to the charging modules (step A"2).

Figure 26:
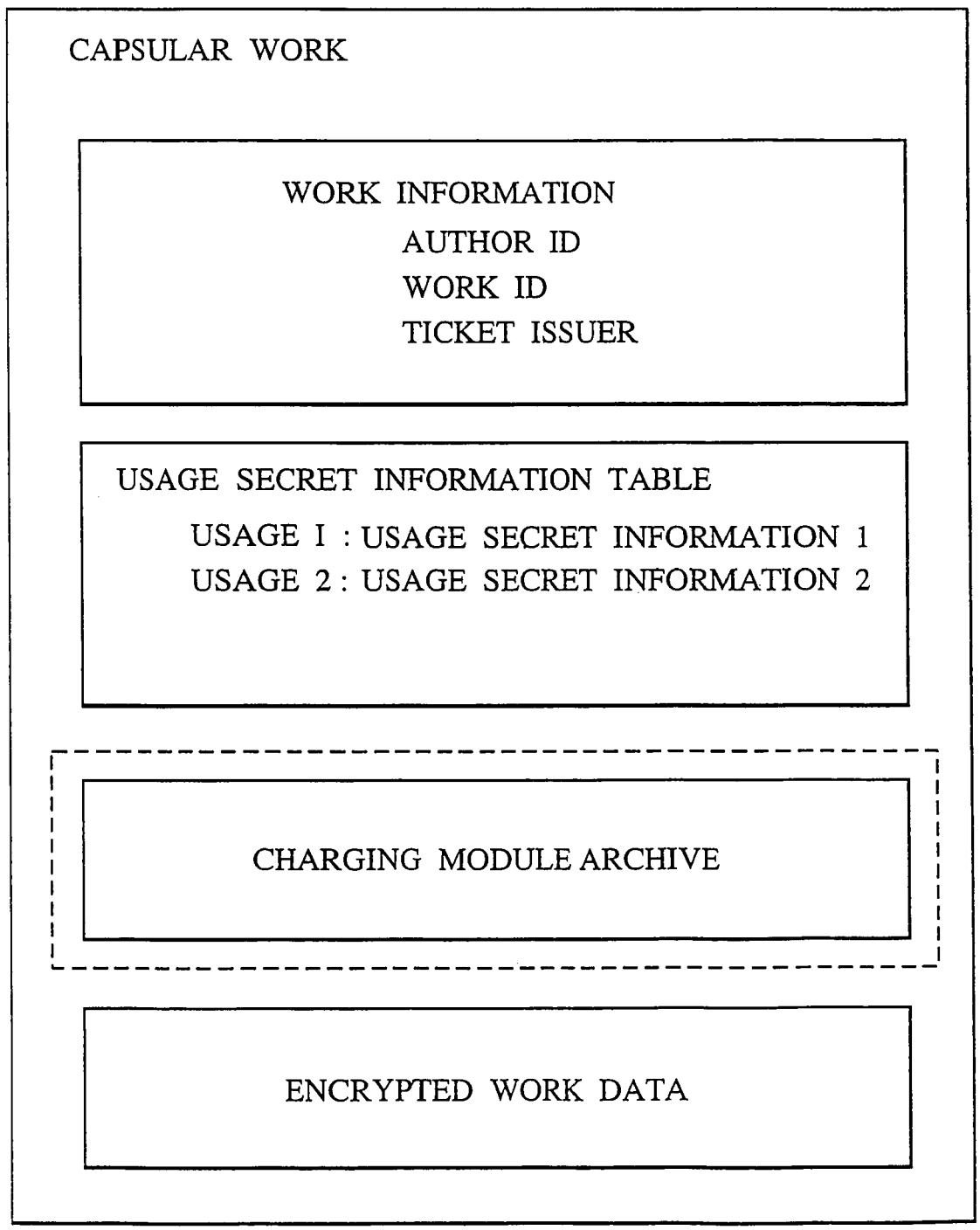
FIG. 26 is a diagram exemplifying the structure of a capsular work according to the third embodiment of the present invention.
Figure 28:
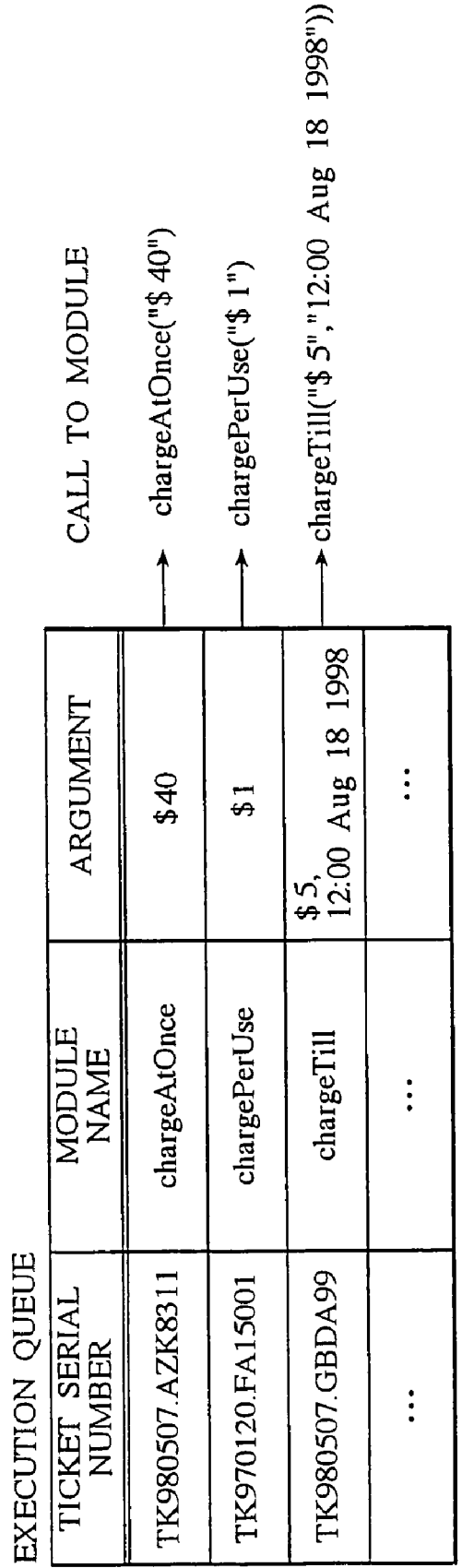
FIG. 28 is a diagram illustrating an example of an execution queue.

Following the above, the encapsulating processing section 15 encrypts the work data (step A"3). Then, based on the charging modules set to the respective usages in the above-described manner, the encapsulating processing section 15 creates a charging module archive which contains the execution forms (load modules) of the respective charging modules (step A"4). Then, the encapsulating processing section 15 creates a ticket key and usage secret information in the same manner as the encapsulating processing section 15 of the first embodiment (step A"5), generates a capsular work structured as shown in FIG. 26 and containing the encrypted work data, the usage secret information table, other work information and the charging module archive (step A"6), and registers the capsular work in the distribution center apparatus 3 (step A"7).

Meanwhile, as well as ticket keys, the names of the charging modules and their corresponding arguments are embedded in the usage condition descriptions (step A"8), and registered in the ticket server apparatus 2 through the registration interface section 16 (step A"9).

Next, the process carried out by step C" shown in FIG. 23 will be explained in detail.

The audiovisual apparatus 9 determines whether the required ticket has already been acquired before use of the capsular work (step C"1). In the case where the required ticket has not yet been acquired, the audiovisual apparatus 9 acquires the ticket from the ticket server apparatus 2 as in the case of the audiovisual apparatus 4 of the first embodiment, and then stores the ticket (steps C"2 to C"7). In the case where the ticket has already been acquired, the audiovisual apparatus 9 performs processing for restoring the work data from the stored ticket.

The ticket in that case contains charging information stored in its charging information field, in addition to various data (the work ID, the author ID, etc.) contained in the ticket of the first embodiment. The charging information includes the name of a charging module and a description concerning an argument such as the charge amount which is applied to the charging module (FIG. 27).

Using the ticket, the encapsulating processing section 48 of the audiovisual apparatus 9 divides the capsular work into plural data, as in the case of the audiovisual apparatus 4 of the first embodiment (step C'8).

Thereafter, the audiovisual apparatus 9 refers to the charging information field of the ticket, and sends the charging information to the charging processing section 98. The charging processing section 98 records the charging information in the execution queue management subsection 981 (step C"9). The execution queue management subsection 981 retains the charging information in the form of a table showing the ticket serial number, the charging module name, the charged amount and an argument to be applied to any other charging module. This table will hereinafter be referred to as the execution queue.

Subsequent to the above, the charging processing section 98 extracts the charging module corresponding to the ticket registered in the execution queue through the charging module storing section 99, and causes the charging module executing subsection 982 to execute the charging module in order to carry out the charging processing (step C"10).

The charging module is a program which describes the charging method. The charging module can describe, as the charging method, a charging system such as a lump payment system in which a use can be repeatedly made according to the same usage by paying the charged amount designated at the time of use, or a pay-per-view system in which a predetermined charged amount needs to be paid each time a use is made. Furthermore, in the audiovisual apparatus 9, basic methods such as those shown in FIG. 29 have been prescribed so that the charging processing can be performed in response to a predetermined call. Procedures for driving the individual elements of the audiovisual apparatus 9 have also been predefined as built-in methods. By calling one built-in method within the charging module, processing such as passing the charge information to the electronic wallet apparatus 110 can be conducted. Furthermore, any user-defined methods defined by authors, etc. can also be adopted.

Figures 30A, 30B:
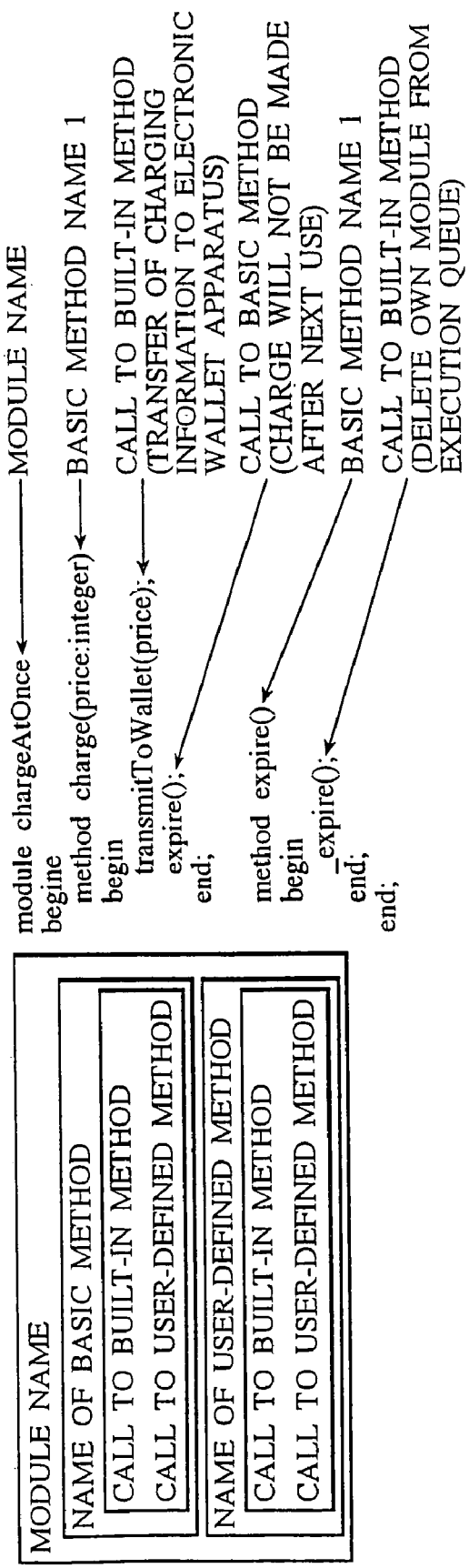
FIGS. 30(a) and 30(b) are diagrams illustrating the structures of the charging modules and their specific examples.

In the definitions of the basic methods, various charging processing can be performed by combining the built-in methods and any user-defined methods in various ways and calling combinations thereof (FIGS. 30(*a*) and 30(*b*)).

A specific example of the charging processing carried out by the charging module will now be described. The charging module involves the basic method "charge( )". The charging module executing subsection 982 is programmed so as to execute the charging processing by calling the method "charge( )" and passing arguments (the charged amount, the corresponding ticket and any other information), regardless of the module type. The called method "charge( )" informs the electronic wallet apparatus 101 of the charged amount and information concerning the money deposition destination, etc. received as the arguments. The electronic wallet apparatus 101 retains the received information as the charged amount information, communicates with the account settling server apparatus 111 at predetermined time intervals (e.g. a day), and carries out account settling processing for depositing the charged amount into the designated deposition destination.

The basic method "expire( )" is called when needed. By executing the method "expire( )", the charging module is deleted from the execution queue. In the case where the method "disable_ticket( )" is called, the corresponding ticket is invalidated. Hereafter the invalidated ticket is not handled as a normal ticket at the time of use of a work. On the other hand, in the case where the method "transmitToWallet( ))" is called, the amount specified by one argument is recorded in the electronic wallet apparatus 9 as the amount to be paid.

According to a specific example of the charging module, the method "charge( )" is called first, whereby the methods "expire( )" and "disable_ticket( )" are called, under which condition a charge is made by what is called the pay-per-view system. In the case where only the method "expires" is called as a result when the method "charge" being called first, a conventional purchasing system is realized (in which the price for a goods is paid at the time the goods is received). In the case where the method "charge( )" is called employing the purchasing date and the usability term as the arguments and when the methods "expire( )" and "disable_ticket( )" are called on the day after the expiration of the usability term starting on the purchasing date, a charging system with a time limit like that in the case of a video rental is realized.

In the third embodiment, by employing an appropriate charging module, an appropriate charging method can be flexibly selected depending on the intentions of an author and a seller as to the distribution or depending on the characters of a work. Furthermore, the third embodiment has a good affinity for a preexisting account settling mechanism, since the charging processing and the account settling processing can be performed by two stages and a conventional electronic account settling system such as SET can be adopted in communications between the electronic wallet apparatus 100 and the account settling server 101.

Modifications of the Embodiments

The present invention is not limited to the above-described embodiments, and various modifications and applications are possible. Modifications of the above-described embodiments which are applicable to the present invention will now be described.

In the first embodiment, the capsular work generated by the editing apparatus 1 can be written in a nonvolatile memory such as a writable compact disk, without registering the capsular work in the distribution center apparatus 3 through the registration interface section 16. Whether to record the capsular work in the nonvolatile memory is determined by an author. In the case of acquiring the capsular work through the audiovisual apparatus 4 under the above circumstances, the nonvolatile memory is obtained and access is gained to the nonvolatile memory in the capsular work storing section 44, instead of gaining access to the distribution center apparatus 3. Under those conditions, physical distribution can be achieved by placing such nonvolatile memories in shops, which is advantageous when the size of the work data is considerably large and therefore can hardly be distributed across a network.

In the second embodiment, the key dividing subsection 654 of the editing apparatus 6 is also capable of generating, based on ticket key K1 of the primary author, ticket key K2 of the secondary author which serves as a key divisional function., in accordance with the common key cryptographic system using original ticket key R as a key. In this case, the key combining subsection 782 of the second audiovisual apparatus 7 restores R from K1 in accordance with the common key cryptographic system using ticket key K2 as a key. However, the ticket key of the $n^{th}$ work (n>2) cannot be generated through the key division in accordance with the common key cryptographic system as explained previously.

The use of key divisional function f enables the ticket keys of such an tertiary or $n^{th}$ work et seq. to be generated. In this case, the editing apparatus 6 acquires ticket keys K1 to Kn−1 of the primary to $(n-1)^{th}$ authors and generates original ticket key R. Then, using key divisional function f, the key dividing subsection 654 calculates Equation 9.

$$Kn = f(K1, K2, \ldots, Kn-1, R) \qquad \text{(Equation 9)}$$

The key combining section 782 of the second audiovisual apparatus 7 calculates following Equation 10 as explained previously, thereby restoring original ticket key R.

$$R = finv(K1, K2, \ldots, Kn-1, Kn) \qquad \text{(Equation 10)}$$

In this case, the order in which the ticket keys K1 to Kn−1 of the primary to $(n-1)^{th}$ authors are acquired is arbitrary.

In the first to third embodiments described above, a symmetric encryption system in which a common key is used for encryption and decryption is adopted to generate ticket keys. However, an asymmetric encryption system in which different keys are used for encryption and decryption can also be adopted to generate ticket keys.

In the first to third embodiments explained above, the editing apparatuses 1, 6, 8, the ticket server apparatus 2 and the distribution center apparatus 3 are realized on different computer machines, and are connected to each other via a network. However, all or given two of those apparatuses may be realized on the same computer machine.

The editing apparatuses 1, 6, 8, the ticket server apparatus 2, the distribution center apparatus 3, the audiovisual apparatuses 4, 5, 7 and 9 of the first to third embodiments can be attained by distributing computer usable storage mediums such as CD-ROMs or floppy disks containing programs stored therein for realizing the functions of the respective apparatuses.

According to the present invention, as explained above, the distributed capsular work does not contain the decryption key of its work data. Therefore, the work data can be distributed freely. In the case of allowing a user to make use of the work data, a ticket encryption key is distributed to him/her. This enhances the work distribution area and promotes the use of the work data.

Furthermore, ticket keys (encryption keys and decryption keys) which differ depending on the usage conditions for usages of the work data can be generated. This enables the work data to be used on the usage conditions set so that the intentions of an author and a seller are reflected as regards the use of a work.

Moreover, by generating the secondary work data and setting the secondary work data as the distribution target, the second work data can be distributed in the same manner as the primary work data. This promotes the work authoring activities. In order to make use of the secondary work, a ticket decryption key of the original work data on which the secondary work bases is also required. Thus, the copyright owned by the primary author is protected satisfactorily.

Furthermore, by generating the charging modules for the respective usage conditions and performing the charging processing in accordance with any appropriate charging module, an appropriate charging method can be flexibly selected depending on the intentions of an author and a seller or depending on the characters of a work.

This application is based on Japanese Patent Application No. H10-213789 filed Jul. 29, 1998, and including specification, claims, drawings and summary. The disclosure of the above Japanese Patent Application is incorporated herein by reference in its entirety.

What is claimed is:

1. A digital work distribution system for distributing digital works over a network to a user computer, comprising:
    first and second computers connected to each other via a network and connected to a user computer via the network,
    said first computer configured for setting conditions for plural usages of the work data to be distributed,
    encrypting said work data with a predetermined encryption key,
    generating different ticket encryption keys and corresponding ticket decryption keys, each of said ticket encryption keys and the corresponding one of said ticket decryption keys being associated with a corresponding one of conditions for one usage among the set conditions for the plural usages,
    encrypting a predetermined decryption key corresponding to said predetermined encryption key, by using each of said ticket encryption keys generated each in association with the conditions for one of the plural usages, and
    encapsulating said work data and said predetermined decryption key encrypted using each of said ticket encryption keys generated each in association with the conditions for one of the plural usages, and generating a capsular work which contains said work data and said predetermined decryption key; and
    said second computer storing the conditions for the plural usages which have been set by said first computer and said ticket decryption keys corresponding to said ticket encryption keys generated each in association with the conditions for one of the plural usages and used to encrypt said predetermined decryption key, encrypting, in reply to an external request for use of said work data received over the network from a user computer, a ticket decryption key which is associated with the conditions for one usage corresponding to the request among the stored ticket decryption keys, and
    distributing the encrypted ticket decryption key to a requester at the user computer who has made the request for use of said work data.

2. The digital work distribution system according to claim 1, wherein said predetermined encryption key and said predetermined decryption key corresponding thereto are an identical key adopting a common cryptographic system.

3. The digital work distribution system according to claim 1, wherein a common cryptographic key which is a random number is used for encryption and decryption of said capsular work.

4. The digital work distribution system according to claim 1, wherein each of said ticket encryption keys and a corresponding one of said ticket decryption keys are an identical key adopting a common cryptographic system.

5. The digital work distribution system according to claim 1, wherein,
    the network is the Internet, and
    the conditions set for the plural usages of the work data to be distributed include plural alternative display mode options and plural viewing charge conditions based on corresponding ones of the set display mode options, the display mode options including each one of i) full-color display mode, ii) monochrome display mode, iii) a first displayable resolution mode, and iv) a second displayable resolution mode.

6. The digital work distribution system according to claim 1, wherein,
    said first computer further comprises:
    generating charging modules making a charge for the work data to be distributed, each of said charging modules being associated with the conditions for one of the plural usages;
    a part further encapsulating, in said capsular work, said charging modules generated each in association with the conditions for one of the plural usages; and
    said second computer further comprises:
    a part storing pieces of charging module identification for identifying said charging modules, in association with the conditions for the plural usages, and
    set display restrictions that include plural set display resolutions.

7. The digital work distribution system according to claim 1, further comprising:
    a third computer connected to the network, said third computer:
    acquiring said capsular work generated by said first computer;
    acquiring, from the second computer, the ticket decryption key corresponding to a ticket encryption key associated with the conditions for a desired one of the plural usages and contained in the acquired capsular work;
    decrypting, with the acquired ticket decryption key, the encrypted decryption key contained in said capsular work;
    decrypting said work data contained in said capsular work by using the decrypted decryption key; and
    reproducing the decrypted work data.

8. A digital work distribution method for distributing digital works between at least one host computer source and a requester computer communicating via a network, comprising:
    connecting a host computer source to a network;
    from the host computer, setting conditions for plural usages of work data to be distributed;
    encrypting said work data with a predetermined encryption key;

generating different ticket encryption keys and corresponding ticket decryption keys, each of said ticket encryption keys and the corresponding one of said ticket decryption keys being associated with a different one of the set conditions of the plural usages;

encrypting a predetermined decryption key corresponding to said predetermined encryption key, by using each of said ticket encryption keys generated in association with the conditions for different one of the plural usages;

encapsulating said work data and said predetermined decryption key encrypted using each of said ticket encryption keys associated each with the conditions for the different one of the plural usages, and generating a capsular work which contains said work data and said predetermined decryption key;

storing, in association with each other, the set conditions for the plural usages and said ticket decryption keys corresponding to said ticket encryption keys generated each in association with the conditions for one of the plural usages and used to encrypt said predetermined decryption key;

encrypting, in reply to an external request for use of said work data received over the network from a requester computer, a ticket decryption key which is associated with the conditions for one usage corresponding to the request among the stored ticket decryption keys; and distributing the capsular work which contains said work data to the requestor computer, and separately distributing the encrypted ticket decryption key to the requester computer who has made the request for use of said work data.

9. A digital work reproduction method for reproducing digital works, comprising:

acquiring, over a network from a first source, a capsular work in which work data encrypted with a predetermined encryption key, and a predetermined decryption key corresponding to said predetermined encryption key and encrypted with each of different ticket encryption keys associated each with conditions for one of plural usages of said work data, are encapsulated;

acquiring, over the network from a second source, a ticket decryption key corresponding to a ticket encryption key associated with the conditions for a desired one of the plural usages and contained in the acquired capsular work;

decrypting, with the acquired ticket decryption key, the encrypted predetermined decryption key contained in said capsular work;

decrypting, with the decrypted predetermined decryption key, said work data contained in said capsular work; and reproducing the decrypted work data.

10. A computer program product, including a computer readable storage medium having a computer readable program embodied therein for executing:

acquiring a capsular work in which work data encrypted with a predetermined encryption key, and a predetermined decryption key corresponding to said predetermined encryption key and encrypted using each of different ticket encryption keys associated with conditions for plural usages of said work data, are encapsulated;

separately acquiring a ticket decryption key corresponding to a ticket encryption key which is associated with the conditions for a desired one of the plural usages and which is contained in the acquired capsular work;

decrypting, with the acquired ticket decryption key, the predetermined decryption key encrypted using said ticket encryption keys and contained in said capsular work;

decrypting said work data contained in said capsular work by using the decrypted predetermined decryption key; and reproducing the decrypted work data.

11. A digital work distribution system for distributing digital works to a user computer, comprising:

a ticket server apparatus which manages tickets;

a distribution center apparatus which distributes encrypted works to a user;

an editing apparatus with which an author edits, encapsulates, and encrypts work data and sets usage conditions for plural usages of the work data to be distributed by the distribution center as the encrypted works;

the editing apparatus comprising an input section, an output section, a usage condition setting section, an editing processing section, an encapsulating processing section, and a registration interface section, the editing processing section creating the work data in accordance with an input of the author from the input section, the usage condition setting section creating the usage conditions of the work data produced by the editing processing section while carrying on a dialog with the author through the input section and the output section, the encapsulating processing section having a ticket key generating subsection generating ticket keys, a random number generating subsection generating a random number R, and an encrypting subsection i) using each of ticket keys generated by the ticket key generating subsection to encrypt the random number R generated by the random number generating subsection and create a usage secret information table based on the encryption results, and ii) encrypting the random number R and the work data produced by the editing processing section to generate a capsular work data combining the encrypted random number R, the encrypted work data, and the usage secret information table, the registration interface section allowing the author to i) register the usage conditions of the work data and a ticket key in the ticket server apparatus, and ii) register the capsular work in the distribution center apparatus; and an audiovisual apparatus that i) accepts the work from the distribution center apparatus responsive to a user-request to acquire the work made to the distribution center apparatus, ii) acquires a ticket for using the work from the ticket server apparatus responsive to a user-request to use the work made to the ticket server apparatus, and iii) allows the user to make use of the work through the audiovisual apparatus, the ticket server apparatus, the distribution center apparatus, the editing apparatus, and the audiovisual apparatus each being separately connected to the Internet and through the Internet connected to each other.

12. The system of claim 11, wherein, the editing apparatus is owned by an author, the ticket server and the distribution center apparatus are owned by one of the author and a sales agent, and the audiovisual apparatus is owned by the user.

13. The system of claim 11, wherein, the ticket server apparatus includes a registration interface section, a usage condition storing section, a usage condition discriminating section, a ticket generating section, a ticket encrypting section, and a distribution interface section, the registration interface section, of the ticket server apparatus, performs communications for the registration of the usage conditions and ticket key created by the editing apparatus, the usage condition storing section, of the ticket server apparatus, stores the usage conditions and ticket key acquired from the registration interface section, the usage condition discriminating section, of the ticket server apparatus, discriminates whether the usage which the audiovisual apparatus has requested through the distribution interface section matches the usage conditions, the ticket generating section, of the ticket server apparatus, generates a ticket based on the usage conditions and ticket key stored in the usage condition storing section, the ticket encrypting section, of the ticket server apparatus, takes out an appropriate ticket from the usage condition storing section and encrypting the taken out ticket depending on who is the user thereof, when the usage condition discriminating section determines that the usage requested by the audiovisual apparatus matches the usage conditions, and the distribution interface section, of the ticket server apparatus, receives the request from the audiovisual apparatus and transmits the encrypted ticket generated by the ticket encrypting section to the audiovisual apparatus.

14. The system of claim 13, wherein, the distribution center apparatus includes a registration interface section, a capsular work storing section, and a distribution interface section, the registration interface section, of the distribution center apparatus, receives the capsular work generated by the editing apparatus, the capsular work storing section, of the distribution center apparatus, stores the capsular work received by the registration interface section, and the distribution interface section, of the distribution center apparatus, transmits a list of works stored in the capsular work storing section to the audiovisual apparatus and transmits, to the audiovisual apparatus, a specific capsular work which meets the request sent from the audiovisual apparatus.

15. The system of claim 11, wherein, the audiovisual apparatus includes a user input section, a user output section, a reproducing processing section, a ticket interface section, a ticket storing section, a capsular work interface section, a capsular work storing section, and a decapsulating section, the reproducing processing section, of the audiovisual apparatus, reproduces the work data acquired from the decapsulating section, the ticket interface section, of the audiovisual apparatus, receives a ticket from the ticket server apparatus, in accordance with the capsular work and the usage requested by the user, the ticket storing section, of the audiovisual apparatus, stores the ticket acquired from the ticket interface section, the capsular work interface section, of the audiovisual apparatus, receives a list of works from the distribution center apparatus and receives a work selected by the user on the basis of the list from the distribution center apparatus, the capsular work storing section, of the audiovisual apparatus, stores the capsular work acquired from the capsular work interface section, and the decapsulating section, of the audiovisual apparatus, acquires the capsular work requested by the user from the capsular work storing section, acquires the ticket for the capsular work from the ticket storing section, and decrypts the capsular work containing the work data using the acquired ticket.

16. The system of claim 11, wherein, the conditions set for the plural usages of the work data to be distributed include plural display mode conditions and plural viewing charge conditions based on corresponding ones of the set display mode conditions.

17. The system of claim 16, wherein the display mode conditions are one of i) full-color display mode, ii) monochrome display mode, iii) a first displayable resolution mode, and iv) a second displayable resolution mode.

18. The system of claim 11, wherein, the conditions set for the plural usages of the work data to be distributed include plural display mode conditions and plural viewing charge conditions based on corresponding ones of the set display mode conditions, and the display mode conditions are i) full-color display mode, ii) monochrome display mode, iii) a first displayable resolution mode, and iv) a second displayable resolution mode.

19. A digital work distribution system for distributing digital works to a user computer, comprising:

a ticket server apparatus which manages tickets over the Internet;

a distribution center apparatus which distributes encrypted works to a user over the Internet;

an editing apparatus with which a works provider edits, encapsulates, and encrypts work data and sets usage conditions for plural usages of the work data to be distributed by the distribution center as the encrypted works;

the editing apparatus generating ticket keys to encrypt a random number and create a usage secret information table based on the encryption results, the editing apparatus encrypting the work data produced by the editing processing section to generate a capsular work data combining the encrypted random number R, the encrypted work data, and the usage secret information table, the editing apparatus registering i) the usage conditions of the work data and a ticket key in the ticket server apparatus, and ii) the capsular work in the distribution center apparatus; and an audiovisual apparatus that, over the Internet , i) accepts the work from the distribution center apparatus responsive to a user-request to acquire the work made to the distribution center apparatus, ii) acquires a ticket for using the work from the ticket server apparatus responsive to a user-request to use the work made to the ticket server apparatus, and iii) allows the user to make use of the work through the audiovisual apparatus.

20. The system of claim 19, wherein, the editing apparatus is owned by an the works provider, the ticket server and the distribution center apparatus are owned by one of the works provider and a sales agent, and the audiovisual apparatus is owned by the user.

* * * * *